US012651049B2

(12) United States Patent
Sammoura et al.

(10) Patent No.: US 12,651,049 B2
(45) Date of Patent: Jun. 9, 2026

(54) SPOOF DETECTION USING LOCALIZED ILLUMINATION FOR BIOMETRIC AUTHENTICATION SYSTEMS

(71) Applicant: Google LLC, Mountain View, CA (US)

(72) Inventors: Firas Sammoura, Dublin, CA (US); James Brooks Miller, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 303 days.

(21) Appl. No.: 18/319,200

(22) Filed: May 17, 2023

(65) Prior Publication Data

US 2023/0385393 A1 Nov. 30, 2023

Related U.S. Application Data

(63) Continuation of application No. PCT/US2022/072601, filed on May 26, 2022.

(51) Int. Cl.
*G06F 21/32* (2013.01)
*G06F 3/041* (2006.01)
(Continued)

(52) U.S. Cl.
CPC ............ *G06F 21/32* (2013.01); *G06V 10/141* (2022.01); *G06V 10/70* (2022.01); *G06V 40/1318* (2022.01); *G06V 40/1394* (2022.01); *G06F 3/04186* (2019.05); *G06F 3/0446* (2019.05); *G06F 2203/04104* (2013.01)

(58) Field of Classification Search
CPC .... G06F 21/32; G06F 3/04186; G06F 3/0446;

G06F 2203/04104; G06V 10/141; G06V 10/70; G06V 40/1318; G06V 40/1394; G06V 10/145; G06V 40/1365; G06V 40/1382
See application file for complete search history.

(56) References Cited

U.S. PATENT DOCUMENTS 12,008,836 B2 6/2024 Kim et al.
2013/0088671 A1 4/2013 Drzaic et al.
(Continued)

FOREIGN PATENT DOCUMENTS

CN 111241890 6/2020
WO 2021257108 12/2021
WO 2024229035 11/2024

OTHER PUBLICATIONS

"International Search Report and Written Opinion", Application No. PCT/US2022/072601, Jan. 16, 2023, 12 pages.
(Continued)

*Primary Examiner* — Abhishek Sarma
(74) *Attorney, Agent, or Firm* — Colby Nipper PLLC

(57) ABSTRACT

This document describes a biometric authentication system including a biometric authentication manager is configured to receive user input at a touch-sensitive display, determine a shape of the user input, and alter a luminosity and/or color of one or more portions of a region of the touch-sensitive display. Through such a technique, the biometric authentication manager can implement spatially, temporally, and/or chromatically variable illumination patterns to produce a fingerprint reflection, receive the fingerprint reflection, and then analyze the fingerprint reflection for authenticity and/or for liveness characteristics effective to detection spoof fingerprints.

20 Claims, 18 Drawing Sheets

(51) Int. Cl.

| | |
|---|---|
| *G06F 3/044* | (2006.01) |
| *G06V 10/141* | (2022.01) |
| *G06V 10/70* | (2022.01) |
| *G06V 40/12* | (2022.01) |
| *G06V 40/13* | (2022.01) |

(56) References Cited

U.S. PATENT DOCUMENTS

| | | |
|---|---|---|
| 2013/0342519 A1 | 12/2013 | Kim et al. |
| 2016/0063933 A1 | 3/2016 | Kobayashi et al. |
| 2016/0337570 A1 | 11/2016 | Tan et al. |
| 2017/0116932 A1 | 4/2017 | Musgrave et al. |
| 2017/0168463 A1 | 6/2017 | Hong et al. |
| 2017/0200054 A1 | 7/2017 | Du et al. |
| 2018/0012006 A1 | 1/2018 | Suh et al. |
| 2018/0018501 A1 | 1/2018 | Mather et al. |
| 2018/0040301 A1 | 2/2018 | Bae et al. |
| 2018/0165508 A1 | 6/2018 | Othman et al. |
| 2018/0300526 A1 | 10/2018 | Cho et al. |
| 2019/0057660 A1 | 2/2019 | Lee et al. |
| 2019/0197944 A1 | 6/2019 | Kim et al. |
| 2019/0228740 A1 | 7/2019 | Aflatooni et al. |
| 2019/0303639 A1 | 10/2019 | He et al. |
| 2019/0303642 A1 | 10/2019 | He et al. |
| 2020/0050818 A1 | 2/2020 | He et al. |
| 2020/0117933 A1 | 4/2020 | Chang et al. |
| 2020/0273427 A1 | 8/2020 | Wang |
| 2020/0327348 A1 | 10/2020 | Kim |
| 2021/0209327 A1 | 7/2021 | Wu et al. |
| 2021/0248350 A1 | 8/2021 | Chang et al. |
| 2021/0264181 A1 | 8/2021 | Park et al. |
| 2021/0271851 A1 | 9/2021 | Chou et al. |
| 2021/0333928 A1 | 10/2021 | Wu et al. |
| 2022/0050506 A1 | 2/2022 | Gehlen et al. |
| 2022/0058254 A1 | 2/2022 | Park et al. |
| 2023/0274573 A1 | 8/2023 | Kim et al. |

OTHER PUBLICATIONS

Choi, et al., "Expediting Fingerprint Authentication by Compensating for Display Luminance Latency", Technical Disclosure Commons, https://www.tdcommons.org/dpubs_series/4686, Oct. 29, 2021, 11 pages.

Chugh, et al., "Fingerprint Spoof Detection: Temporal Analysis of Image Sequence", Dec. 17, 2019, 8 pages.

Ghiani, et al., "Fingerprint liveness detection using Binarized Statistical Image Features", Oct. 2013, 6 pages.

Li-Fong, et al., "A Circular Flexible Amoled Display with a 1-mm Slim Border", May 25, 2016, pp. 847-850.

Lih, et al., "A True Circular 1.39 Inch Amoled for Wearable Application", May 2016, pp. 566-569.

Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.

Ojala, et al., "Multiresolution Gray-Scale and Rotation Invariant Texture Classification with Local Binary Patterns", Jul. 2002, pp. 971-987.

Sammoura, et al., "Fingerprint-Matching Algorithm Using Polar Shapelets", Technical Disclosure Commons; Retrieved from https://www.tdcommons.org/dpubs_series/2471, Sep. 10, 2019, 17 pages.

Sammoura, et al., "Safeguarding Biometric Authentication Systems from Fingerprint Spoof Attacks", Technical Disclosure Commons; Retrieved from https://www.tdcommons.org/dpubs_series/2769, Dec. 16, 2019, 13 pages.

Sammoura, et al., "Spoof Detection for Fingerprint Sensors", Technical Disclosure Commons; Retrieved from https://www.tdcommons.org/dpubs_series/2648, Nov. 5, 2019, 12 pages.

Skanda, "Xiaomi Mi 9 to Feature an Improved In-screen Fingerprint Sensor", https://www.gizchina.com/2019/02/17/mi-9-fingerprint-improved-fingerprint/, Feb. 17, 2019, 10 pages.

"International Search Report and Written Opinion", Application No. PCT/US2024/027072, Jul. 23, 2024, 12 pages.

"Notice of Allowance", U.S. Appl. No. 18/313,138, filed Mar. 12, 2024, 7 pages.

"International Preliminary Report on Patentability", Application No. PCT/US2022/072601, Nov. 7, 2024, 8 pages.

"International Preliminary Report on Patentability", Application No. PCT/US2024/027072, Nov. 11, 2024, 7 pages.

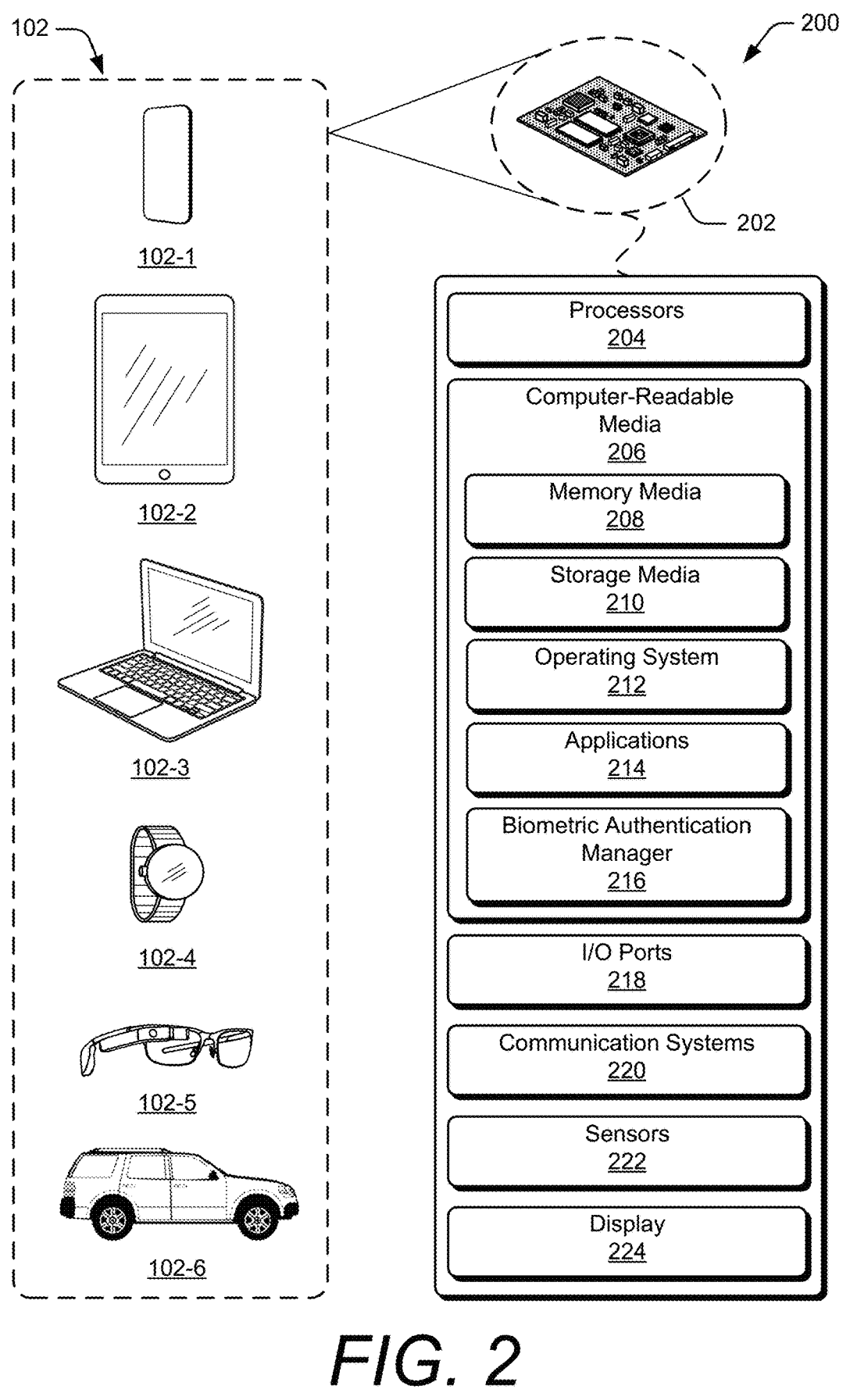

102

200

202

102-1

102-2

102-3

102-4

102-5

102-6

Processors
204

Computer-Readable
Media
206

Memory Media
208

Storage Media
210

Operating System
212

Applications
214

Biometric Authentication
Manager
216

I/O Ports
218

Communication Systems
220

Sensors
222

Display
224

*FIG. 2*

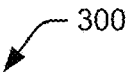
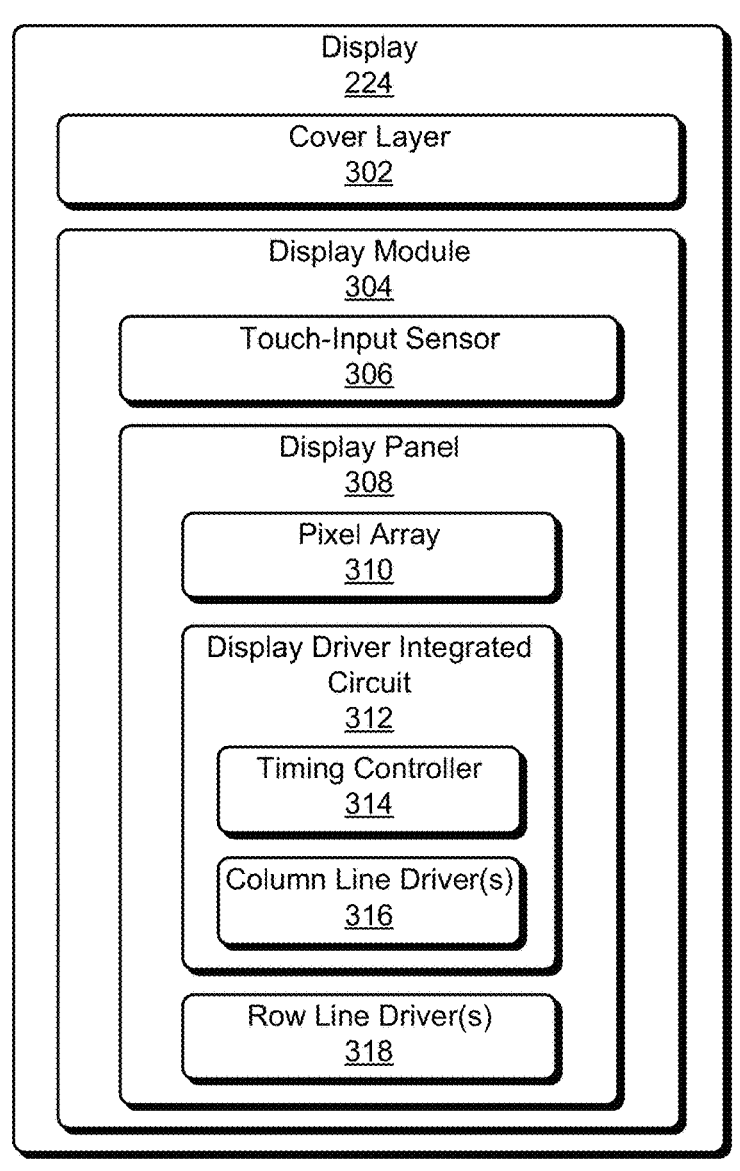
FIG. 3

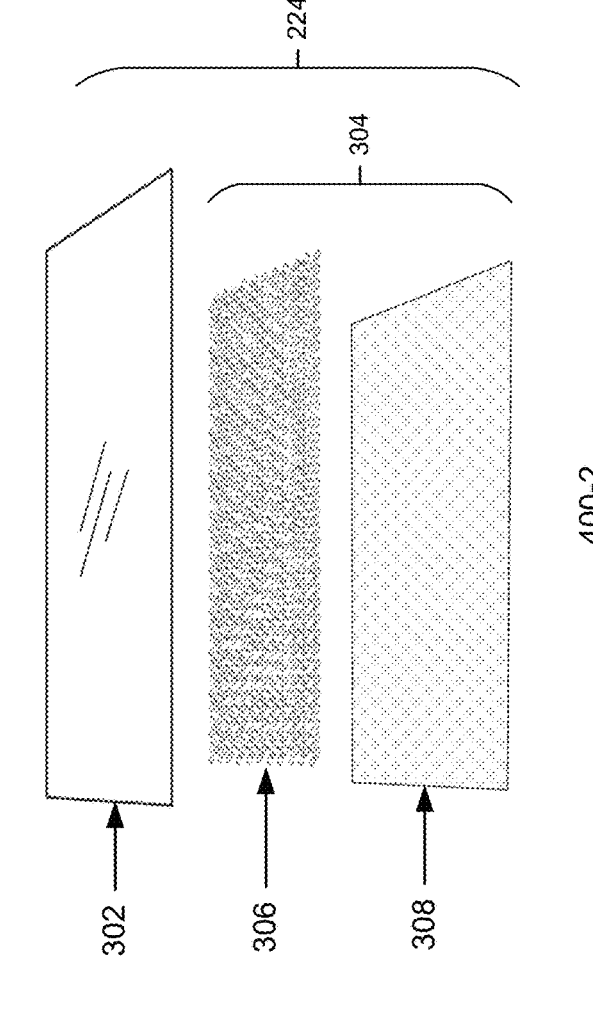
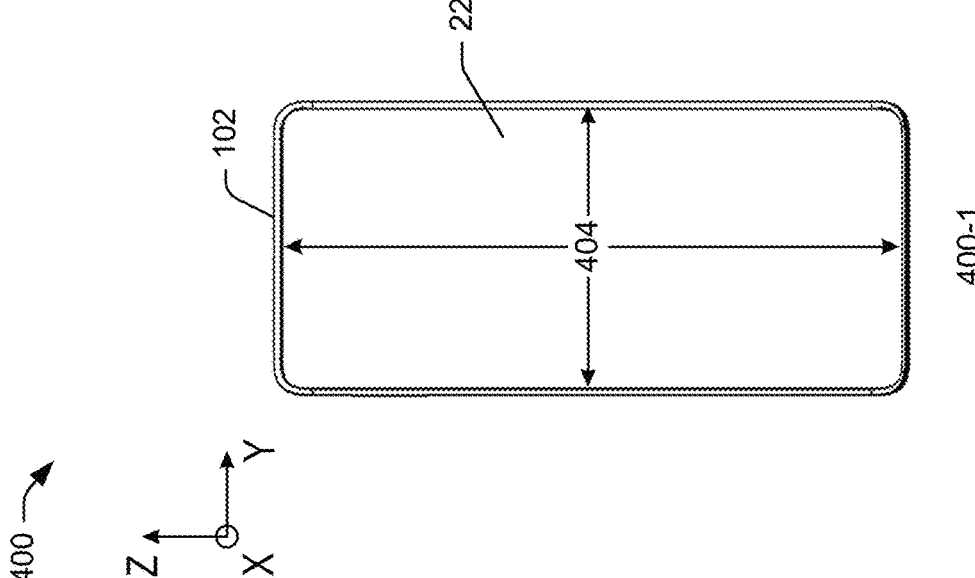
*FIG. 4*

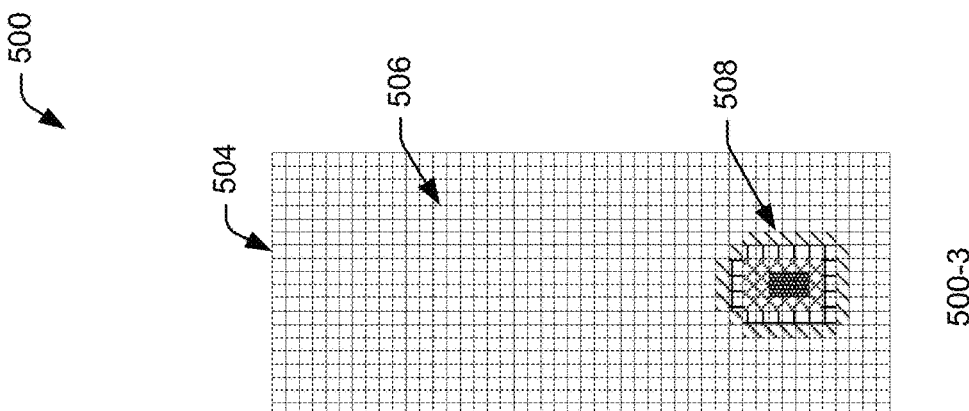
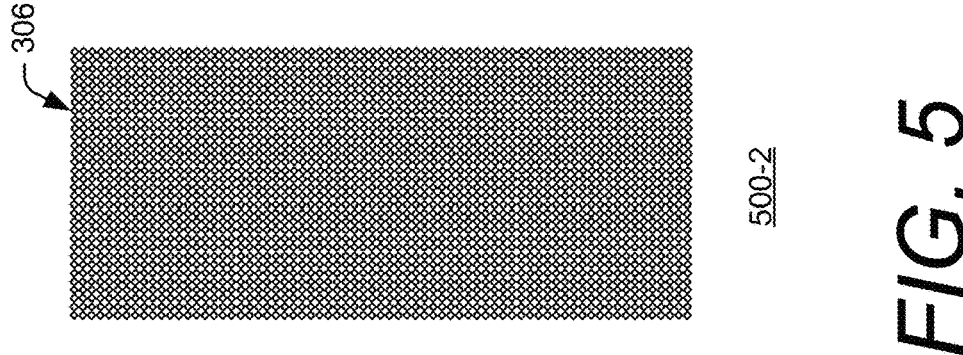
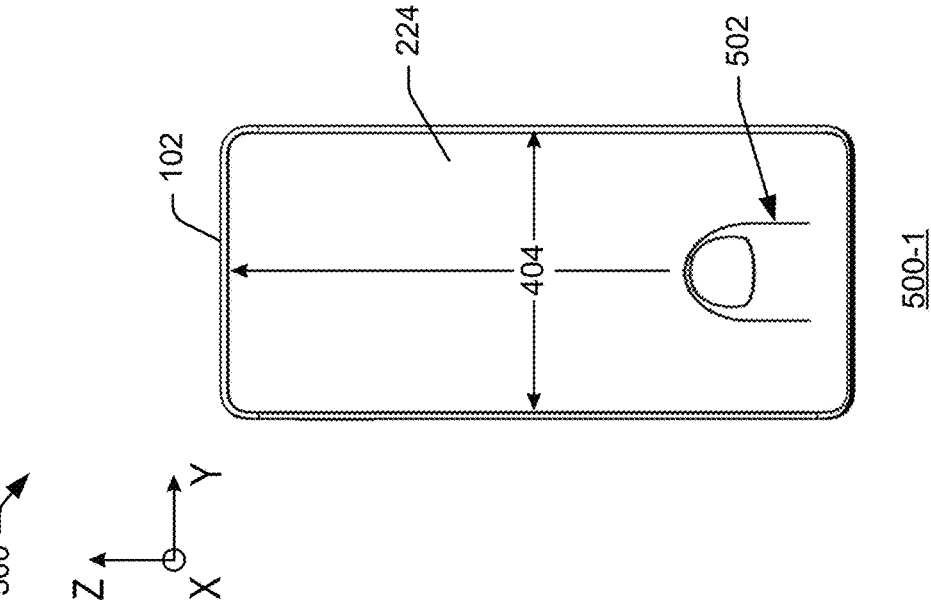
*FIG. 5*

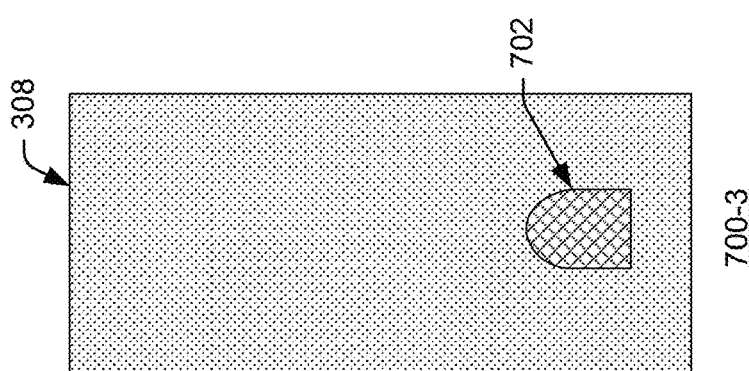
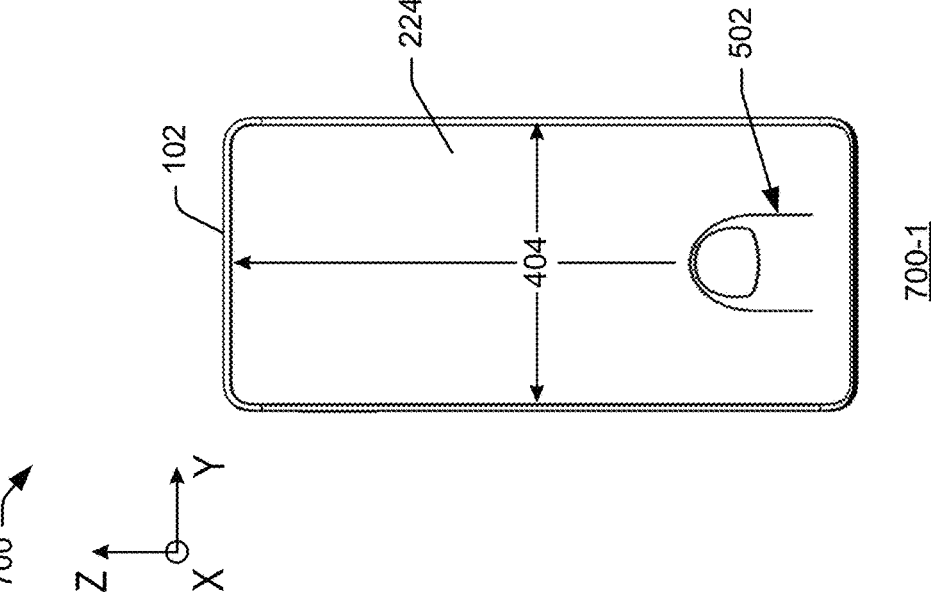
*FIG. 7*

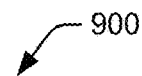
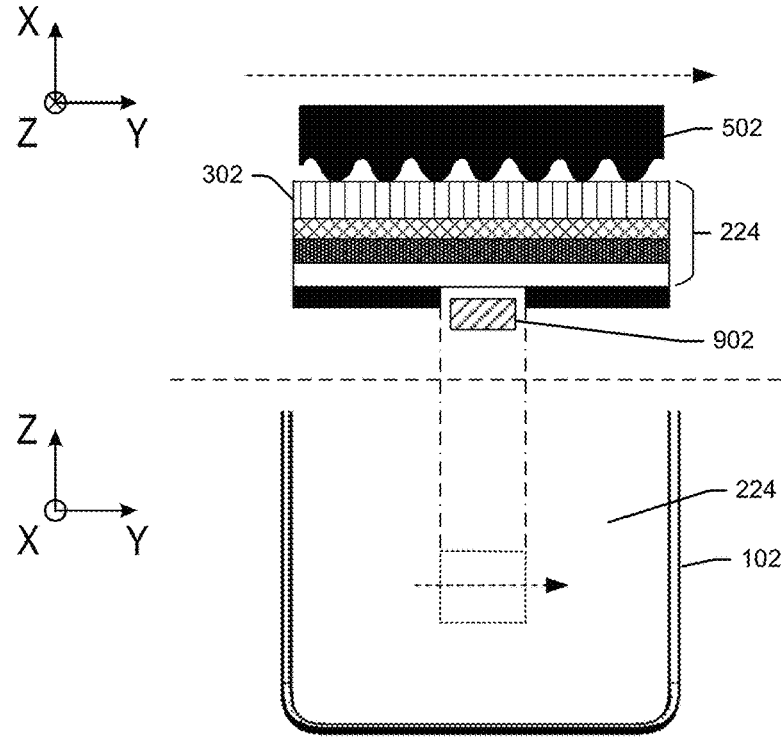
*FIG. 9*

1000

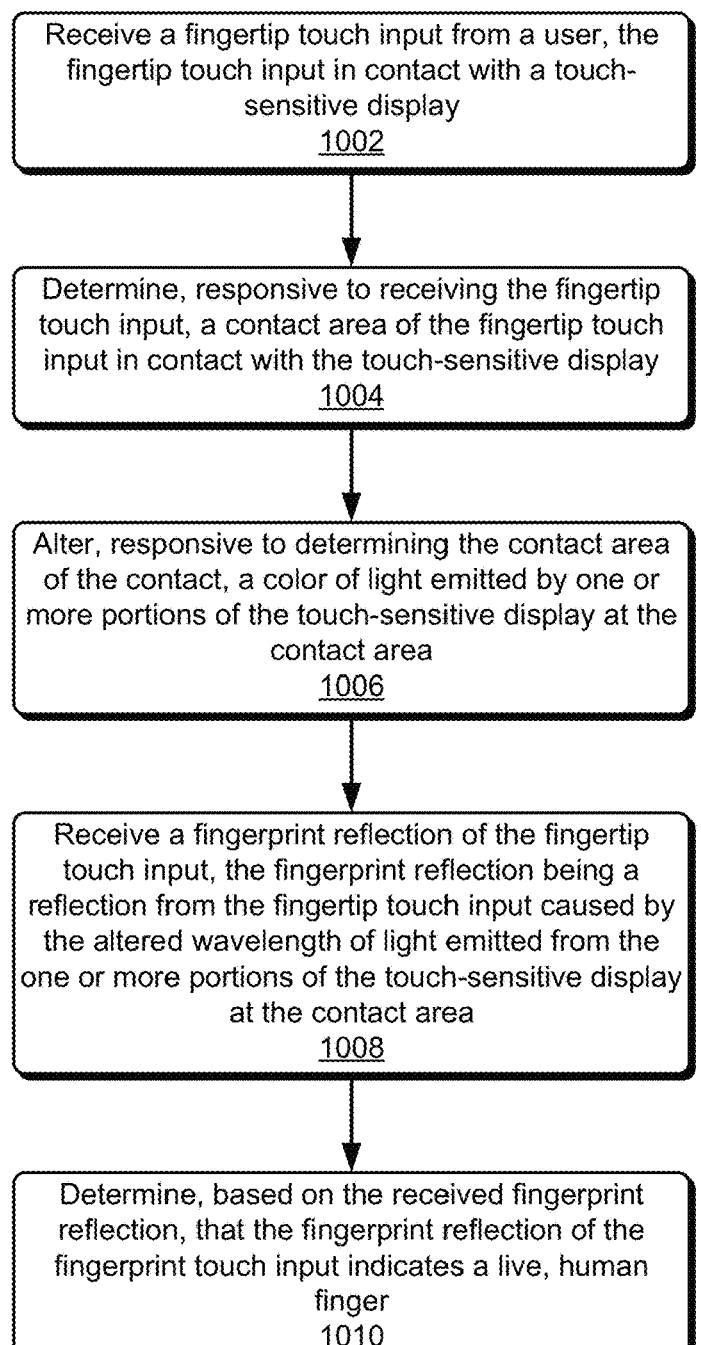

Receive a fingertip touch input from a user, the fingertip touch input in contact with a touch-sensitive display
1002

Determine, responsive to receiving the fingertip touch input, a contact area of the fingertip touch input in contact with the touch-sensitive display
1004

Alter, responsive to determining the contact area of the contact, a color of light emitted by one or more portions of the touch-sensitive display at the contact area
1006

Receive a fingerprint reflection of the fingertip touch input, the fingerprint reflection being a reflection from the fingertip touch input caused by the altered wavelength of light emitted from the one or more portions of the touch-sensitive display at the contact area
1008

Determine, based on the received fingerprint reflection, that the fingerprint reflection of the fingerprint touch input indicates a live, human finger
1010

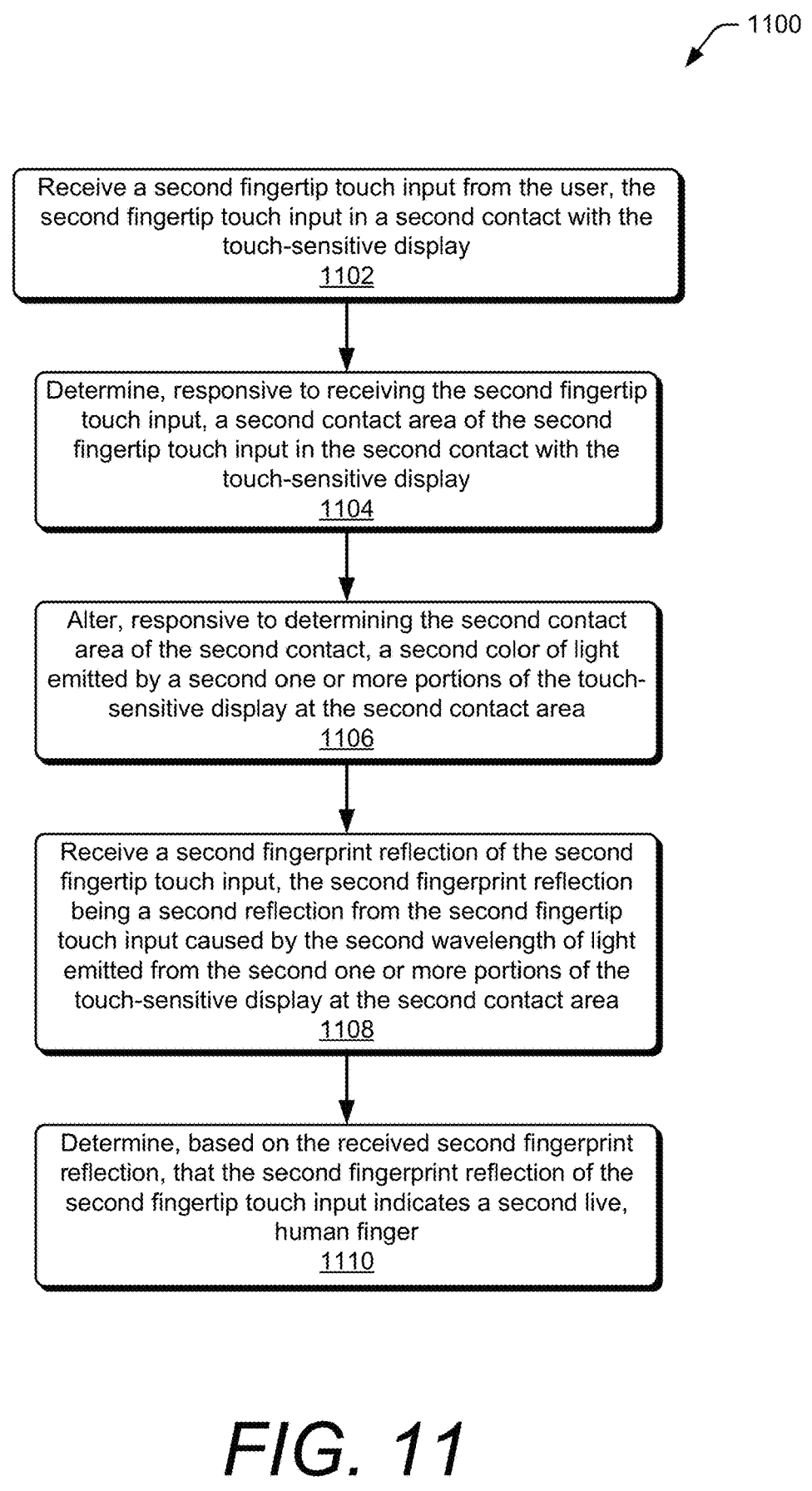

Receive a second fingertip touch input from the user, the second fingertip touch input in a second contact with the touch-sensitive display
1102

Determine, responsive to receiving the second fingertip touch input, a second contact area of the second fingertip touch input in the second contact with the touch-sensitive display
1104

Alter, responsive to determining the second contact area of the second contact, a second color of light emitted by a second one or more portions of the touch-sensitive display at the second contact area
1106

Receive a second fingerprint reflection of the second fingertip touch input, the second fingerprint reflection being a second reflection from the second fingertip touch input caused by the second wavelength of light emitted from the second one or more portions of the touch-sensitive display at the second contact area
1108

Determine, based on the received second fingerprint reflection, that the second fingerprint reflection of the second fingertip touch input indicates a second live, human finger
1110

FIG. 11

SPOOF DETECTION USING LOCALIZED ILLUMINATION FOR BIOMETRIC AUTHENTICATION SYSTEMS

RELATED APPLICATION(S)

This application is a continuation of International Application No. PCT/US2022/072601, filed May 26, 2022, the disclosure of which is incorporated herein by reference in its entirety.

BACKGROUND

Electronic devices continue to make significant contributions to society, such as in the realms of safety, transportation, and communication, propelling their integration into the daily lives of users. To support integration and enhance user experience, many electronic devices are designed to provide users convenient means by which to access, control, or navigate their devices. For instance, some electronic devices permit users to speak voice commands to call family, perform in-the-air gestures to skip songs, offer biometric identifiers to unlock devices, squeeze the housing of a device to activate an intelligent virtual assistant, and many other methods of interaction to operate these devices. These methods of interaction expedite user-input and device-output techniques, enhancing user experience. Due to the ever-increasing integration of electronic devices into users' lives, these electronic devices must support difficult-to-penetrate, state-of-the-art physical and nonphysical (e.g., software) security systems and protocols to thwart multi-domain attacks threatening to expose user data.

Take for instance, biometric authentication systems configured to recognize biometric identifiers of a user and permit or deny access based on an authorization of these biometric identifiers. These biometric authentication systems provide users personalized and convenient manners by which to authenticate themselves and access their devices. Since, for example, fingerprints are unique to every user, electronic devices that require fingerprint authentication in order to access one or more resources thereon provide secure and personalized security services. In some cases, however, bad actors may attempt to undermine such biometric authentication systems by presenting spoof fingerprints (e.g., falsified fingerprints resembling an authorized fingerprint). In this way, bad actors may be able to circumvent the security of biometric authentication systems in electronic devices.

SUMMARY

This document describes systems and techniques directed at spoof detection using spatially-configurable localized illumination for biometric authentication systems. In aspects, a biometric authentication system having a biometric authentication manager is configured to receive user input at a touch-sensitive display, determine a shape of the user input, and alter a luminosity and/or color of light emitted by one or more portions of a region of the touch-sensitive display. Through such a technique, the biometric authentication manager can implement spatially, temporally, and/or chromatically variable illumination patterns to produce a fingerprint reflection, receive the fingerprint reflection, and then analyze the fingerprint reflection for authenticity and/or for liveness characteristics effective to detect spoof fingerprints.

In aspects, a method is disclosed that includes: receiving a fingertip touch input from a user, the fingertip touch input in sustained contact with a touch-sensitive display; determining, responsive to receiving the fingertip touch input, a contact area of the sustained contact with the touch-sensitive display; altering, responsive to determining the contact area of the sustained contact, a color of light emitted by one or more portions of the touch-sensitive display at the contact area; receiving a fingerprint reflection of the fingertip touch input, the fingerprint reflection being a reflection from the fingertip touch input caused by the altered color of light emitted by the one or more portions of the touch-sensitive display at the contact area; and determining, based on the received fingerprint reflection, that the fingerprint reflection of the fingerprint touch input indicates a live, human finger.

In further aspects, an electronic device is disclosed. The electronic device includes an electronic visual display, one or more processors, and memory. The memory stores instructions that, when executed by the one or more processors, cause the one or more processors to implement a biometric authentication manager to provide spatially-configurable localized illumination for biometric authentication systems, by performing the method above.

The details of one or more implementations are set forth in the accompanying drawings and the following description. Other features and advantages will be apparent from the description, the drawings, and the claims. This Summary is provided to introduce subject matter that is further described in the Detailed Description. Accordingly, a reader should not consider the Summary to describe essential features nor threshold the scope of the claimed subject matter.

BRIEF DESCRIPTION OF THE DRAWINGS

The details of one or more aspects for spoof detection using spatially-configurable localized illumination for biometric authentication systems are described in this document with reference to the following drawings:

FIG. 2 illustrates an example implementation of the example electronic device from FIG. 1, which is configured to implement spoof detection using spatially-configurable localized illumination for biometric authentication systems;

FIG. 3 illustrates an example implementation of the display from FIG. 2 in more detail;

FIG. 4 illustrates an example implementation of the example electronic device having the display manufactured as a display panel stack;

FIG. 5 illustrates an example implementation of the example electronic device having an example touch-input sensor configured to detect user input;

FIG. 7 illustrates an example implementation of the example electronic device having the display panel configured to implement spatially-configurable localized illumination for spoof detection by biometric authentication systems;

FIG. 9 illustrates an example implementation of the example electronic device including a biometric authentication system having a fingerprint sensor configured to receive a reflection of user input illuminated by spatially-configurable localized illumination for spoof detection;

FIG. 10 depicts a method for enabling spoof detection using spatially-configurable localized illumination for biometric authentication systems;

FIG. 11 depicts a method for enabling spoof detection using spatially-configurable localized illumination for biometric authentication systems;

The use of same numbers in different instances may indicate similar features or components.

DETAILED DESCRIPTION

Overview

Figure 1:
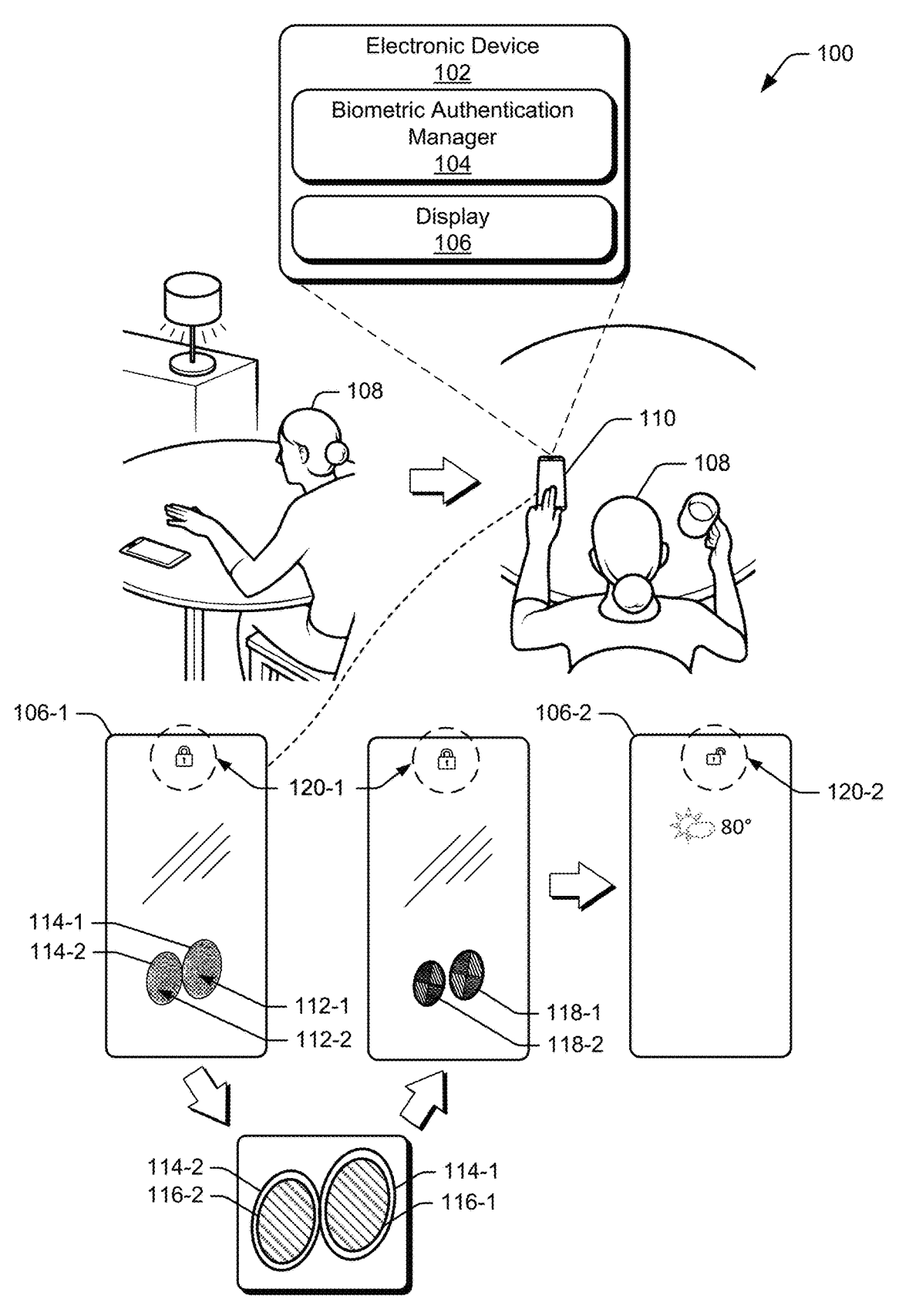
FIG. 1 illustrates an example implementation of an example electronic device having a biometric authentication manager and a display configured to provide spoof detection using spatially-configurable localized illumination for biometric authentication systems.

Many electronic devices (e.g., wireless-network devices, desktops, smartwatches) include an electronic visual display, often simply referred to as a display or screen, integrated as a portion of the electronic device's housing. Electronic device manufacturers fabricate these displays in a layered structure ("display panel stack"), containing a cover layer (e.g., cover glass) and a display module having a display panel.

Display panels increasingly rely on organic light-emitting diode (OLED) technology (e.g., an active-matrix OLED (AMOLED) display), utilizing tens of thousands of pixel circuits each having an organic light-emitting diode ("pixel"). Electronic devices can control any of the pixels within a display panel to illuminate at various intensities and colors, effective to produce on-screen content (e.g., images). By exploiting a feature of the human eye and brain referred to as persistence of vision (e.g., retinal persistence), a display panel can redraw on-screen content at predetermined frequencies ("refresh rate") to save power, change on-screen content (e.g., scrolling) seamlessly, and give an illusion of on-screen content as images in motion (e.g., video). For example, a display panel configured to operate at a 120 hertz (Hz) refresh rate can redraw on-screen content 120 times per second. OLED displays, in comparison to other display technologies, include many advantages such as quick refresh rates, small display response times, and low power consumption. These benefits make OLED displays well-suited for electronic devices and are, therefore, highly prized by users for their image quality.

In addition, electronic devices may include one or more biometric recognition systems. Some electronic devices are configured having one or more biometric recognition systems disposed underneath, or within, the display panel stack, including beneath the cover layer and one or more layers (e.g., all layers, one layer) of the display module. For example, to provide a high screen-to-body ratio and, thereby, preserve space on a display side of an electronic device, manufacturers may embed under-display fingerprint sensors (UDFPS) beneath a display module. Users may then be afforded the opportunity to provide user input (e.g., a finger having a fingerprint, a fingertip touch input) to authenticate themselves to one or more applications or an operating system implemented on the electronic device. If the authentication is successful, then the user can gain access to a plurality of resources offered by the one or more applications or the operating system. Users authenticating themselves to an electronic device using at least one biometric identifier is referred to herein as biometric authentication.

Electronic devices configured to perform biometric authentication using an UDFPS may utilize pixels within one or more regions of the OLED display to illuminate a user input. Due to a low transmissibility of light from an external environment through the display panel to the UDFPS, capturing a well-illuminated user input can be difficult. For example, a display (e.g., the cover layer) may have a visible light transmission (VLT) (e.g., the measurement of light transmission through a given medium) of less than 5%, resulting in sub-optimal image capturing of the user input on the part of the UDFPS. As a result, electronic devices may implement a localized high-luminance region ("high-luminance region") in one or more regions of a display panel to better illuminate user input. Through such a technique, the electronic device may facilitate UDFPS sensing of user input (e.g., fingers having a fingerprint) by implementing a high-luminance region.

However, in some instances, depending on the electronic device and its configuration, high-intensity light radiating from a high-luminance region can irradiate on a user's eye(s) during biometric authentication. Such an event may be frustrating, or even discomforting, to users of electronic devices, lessening their user experience. Many electronic devices are configured having a spatially-fixed fingerprint sensing region. For example, the fingerprint sensing region may be within a bottom portion of a display. Further, the high-luminance region may be defined on a fixed location on the display and may form several morphous shapes including rectangles and ellipses. As a result, if a finger does not sufficiently cover the high-luminance region (e.g., a finger that is in a wrong location, a finger that is too small), the high-intensity light from the high-luminance region may shine in the user's eye(s).

In still further cases, and even more worrisome, a bad actor attempting to infiltrate an electronic device and gain access to the plurality of resources offered by the one or more applications, or the operating system may attack a biometric authentication system on the electronic device. To attack the biometric authentication system, the bad actor may deceive ("spoof") the biometric authentication system by counterfeiting or confusing the biometric authentication system to provide access to the bad actor. In one example, a bad actor may use latent fingerprints of an authorized user residing on a display cover layer of the electronic device to spoof the biometric authentication system into providing access to the bad actor. In more detail, the deposition of oils and sweat from a finger of the authorized user from a previous interaction between the authorized user and the electronic device may create a latent fingerprint usable by a bad actor to deceive the biometric authentication system. In another example, a bad actor may use a lifted fingerprint of the authorized user to replicate the fingerprint of the authorized user and spoof the biometric authentication system.

As an example, a user in a coffee shop may leave his wireless-network device unattended to go do other tasks, such as to go grab some napkins or get a refill. A bad actor, unbeknownst to the user, may take the opportunity while the user is away to gain access to the plurality of resources offered by the one or more applications or the operating system of the wireless-network device. To spoof a biometric authentication system of the wireless-network device, the bad actor may attempt to use latent fingerprints, lifted fingerprints, or other such counterfeits to trick the biometric authentication system into confusing the counterfeits for a fingerprint of the authorized user. In such a scenario, and others like it, the biometric authentication system may mistakenly provide access to an unauthorized user, undermining the security of electronic devices.

In contrast, this document describes systems and techniques directed at spoof detection using spatially-configurable localized illumination for biometric authentication systems. In aspects, an electronic device having a display stack and a biometric authentication system, such as an under-display fingerprint sensor, includes a biometric authentication manager configured to receive user input at a touch-sensitive display, determine a shape of the user input, and alter a luminosity and/or color of light emitted by one or more portions of a region of the touch-sensitive display. Through such a technique, the biometric authentication manager can implement spatially, temporally, and/or chromatically variable illumination patterns to produce a fingerprint reflection, receive the fingerprint reflection, and then analyze the fingerprint reflection for authenticity and/or for liveness characteristics effective to detect spoof fingerprints.

The following discussion describes operating environments, techniques that may be employed in the operating environments, and example methods. Although techniques using and apparatuses for spoof detection using spatially-configurable localized illumination for biometric authentication are described, it is to be understood that the subject of the appended claims is not necessarily limited to the specific features or methods described. Rather, the specific features and methods are disclosed as example implementations and reference is made to the operating environment by way of example only.

Example Device

FIG. 1 illustrates an example implementation 100 of an example electronic device 102 having a biometric authentication manager 104 and a display 106 configured to provide spoof detection using spatially-configurable localized illumination for biometric authentication systems. In one example, as illustrated in FIG. 1, a user 108 sitting at a table for morning coffee in a low-lit room desires to look at her wireless-network device (e.g., electronic device 102) to view daily updates, weather, messages, news, and so on. To access her wireless-network device and view daily content, she places two fingers 110, each having a unique fingerprint (e.g., fingerprint 112-1, fingerprint 112-2), on the display 106 of her wireless-network device.

In response to the user 108 placing her two fingers 110 on the display 106, the biometric authentication manager 104 detects the two fingers 110 (e.g. using a touch-input sensor associated with the display) and determines a shape 114 (e.g., shape 114-1, shape 114-2) for each portion of her two fingers 110 in sustained contact with the display 106. The sustained contact may be defined by, for example, any duration of time sufficient for the biometric authentication manager 104 to detect the two fingers 110, analyze the two fingers 110, determine the shape 114 of the two fingers 110, and/or authenticate the user 108. In some examples, the biometric authentication manager 104 using one or more sensors may be configured to detect the presence of the finger(s) without a sustained contact of the finger(s) on the display. For example, the finger(s) may be situated within a threshold distance of the display (e.g. for at least the predetermined threshold time). In at least some implementations, the biometric authentication manager 104 may resize shape 114-1 and shape 114-2. For example, the biometric authentication manager 104 may resize shape 114-1 and shape 114-2 to two resized shapes 116 (resized shape 116-1 and resized shape 116-2). In some implementations, the biometric authentication manager 104 may resize shapes 114 to reduce light leakage around the two fingers 110.

Based on resized shape 116-1 and resized shape 116-2, the biometric authentication manager 104 may determine two regions 118 (region 118-1 and region 118-2) of the display 106, defining one or more pixels and corresponding to the two resized shapes 116. The two regions 118 of the display may be substantially collocated with the portions of the two fingers 110 in sustained contact with the display 106. Further, the biometric authentication manager 104 may cause (e.g., directly, indirectly) pixels (e.g., organic light-emitting diodes) within one or more portions of the two regions 118 to generate high-luminance light of varying colors (e.g., wavelengths) and luminosities. For example, the biometric authentication manager 104 may cause pixels within one or more portions of each of the two regions 118 to generate high-luminance colored light (e.g., red, green, blue, cyan). In additional examples, the biometric authentication manager 104 may cause pixels within one or more portions of each of the two regions 118 to generate high-luminance white light and other pixels within other portions of the two regions 118 to not illuminate (e.g., remain dark). In further examples, the biometric authentication manager 104 may cause pixels within one or more portions of the two regions 118 to generate light that alternates in color and luminosity over a predetermined duration (e.g., an animation sequence). In so doing, the biometric authentication manager 104 can implement spatially, temporally, and/or chromatically variable illumination on the display 106 for spoof detection by the biometric authentication system. As a result, the two fingers 110, each with their respective fingerprint 112, can be illuminated, so as to facilitate fingerprint sensing and spoof detection.

The biometric authentication manager 104 may be configured to identify and determine liveness characteristics of the user via one or more techniques, including analysis of the user's two fingers 110. For example, the biometric authentication manager 104 may implement at least one of skin spectroscopy, blood oxygen saturation analysis, heart rate analysis, or other such techniques.

Provided the sensed fingerprints 112 of the user 108 indicate likeness to previously enrolled fingerprints and the biometric authentication manager 104 determines liveness characteristics, the biometric authentication manager 104 can then transfer the electronic device 102 from a locked state 120-1 to an unlocked state 120-2, permitting the user 108 access to resources (e.g., applications) of the wireless-network device.

In more detail, consider FIG. 2, which illustrates an example implementation 200 of the example electronic device from FIG. 1, which is configured to implement spoof detection using spatially-configurable localized illumination for biometric authentication systems. The electronic device 102 is illustrated with a variety of example devices, including consumer electronic devices. As non-limiting examples, the electronic device 102 can be a wireless-network device 102-1, a tablet device 102-2, a laptop computer 102-3, a computerized watch 102-4, smart glasses 102-5, and an automotive vehicle 102-6. Although not shown, the electronic device 102 may also be implemented as any of a mobile station (e.g., fixed- or mobile-STA), a mobile communication device, a client device, a home automation and control system, an entertainment system, a gaming console, a personal media device, a health monitoring device, a drone, a camera, an Internet home appliance capable of wireless Internet access and browsing, an IoT device, security systems, and the like. Note that the electronic device 102 can be wearable, non-wearable but mobile, or relatively immobile (e.g., desktops, appliances). Note also that the electronic device 102 can be used with, or embedded within, many electronic devices 102 or peripherals, such as in automobiles or as an attachment to a laptop computer. The electronic device 102 may include additional components and interfaces omitted from FIG. 2 for the sake of clarity.

As illustrated, the electronic device 102 includes a printed circuit board assembly 202 (PCBA 202) on which components and interconnects of the electronic device 102 are embodied. In implementations, the PCBA 202 may include multiple printed circuit boards operably coupled together via, for example, electrical wiring. Alternatively or additionally, components of the electronic device 102 can be embodied on other substrates, such as flexible circuit material or other insulative material. Generally, electrical components and electromechanical components of the electronic device 102 are assembled onto a printed circuit board (PCB) to form the PCBA 202. Various components of the PCBA 202 (e.g., processors and memories) are then programmed and tested to verify the correct function of the PCBA 202. The PCBA 202 is connected to or assembled with other parts of the electronic device 102 into a housing.

As illustrated, the PCBA 202 includes one or more processors 204 and computer-readable media 206. The processors 204 may include any suitable single-core or multi-core processor (e.g., an application processor (AP), a digital-signal-processor (DSP), a central processing unit (CPU), graphics processing unit (GPU)). The computer-readable media 206 includes memory media 208 and storage media 210. The operating system 212, applications 214, and biometric authentication manager 216 implemented as computer-readable instructions on the computer-readable media 206 can be executed by the processors 204 to provide some or all of the functionalities described herein. For example, the processors 204 may perform specific computational tasks of the operating system directed at controlling the creation and display of on-screen content on a display. In still another example, the processors 204 may execute instructions of the operating system to implement a display refresh rate of 120 Hz. The computer-readable media 206 may include one or more non-transitory storage devices such as a random access memory, hard drive, solid-state drive (SSD), or any type of media suitable for storing electronic instructions, each coupled with a computer system bus. The term "coupled" may refer to two or more elements that are in direct contact (physically, electrically, magnetically, optically, etc.) or to two or more elements that are not in direct contact with each other, but still cooperate and/or interact with each other.

In additional aspects, various implementations of the biometric authentication manager 216 can be implemented as, or on, a System-on-a-Chip (SoC), one or more integrated circuits (ICs), a processor with embedded processor instructions or configured to access processor instructions stored in memory, hardware with embedded firmware, a printed circuited board with various hardware components, or any combination thereof. As described herein, a biometric authentication system may include the one or more components of the electronic device 102 illustrated in FIG. 1, including the biometric authentication manager 216, and may be configured to perform biometric authentication, including spoof detection. In additional implementations, the biometric authentication system may be implemented as the electronic device 102.

The PCBA 202 may also include input/output (I/O) ports 218 and communication systems 220. The I/O ports 218 allow the electronic device 102 to interact with other devices or users through peripheral devices, conveying any combination of digital signals, analog signals, and radio-frequency (RF) signals. The I/O ports 218 may include any combination of internal or external ports, such as universal serial bus (USB) ports, audio ports, Serial ATA (SATA) ports, PCI-express based ports or card-slots, secure digital input/output (SDIO) slots, and/or other legacy ports. Various peripherals may be operatively coupled with the I/O ports 218, such as human-input devices (HIDs), external computer-readable storage media, or other peripherals.

The communication systems 220 enable communication of device data, such as received data, transmitted data, or other information as described herein, and may provide connectivity to one or more networks and other devices connected therewith. Example communication systems include NFC transceivers, WPAN radios compliant with various IEEE 802.15 (Bluetooth®) standards, WLAN radios compliant with any of the various IEEE 802.11 (WiFi®) standards, WWAN (3GPP-compliant) radios for cellular telephony, wireless metropolitan area network (WMAN) radios compliant with various IEEE 802.16 (WiMAX®) standards, infrared (IR) transceivers compliant with an Infrared Data Association (IrDA) protocol, and wired local area network (LAN) Ethernet transceivers. Device data communicated over communication systems 220 may be packetized or framed depending on a communication protocol or standard by which the electronic device 102 is communicating. The communication systems 220 may include wired interfaces, such as Ethernet or fiber-optic interfaces for communication over a local network, private network, intranet, or the Internet. Alternatively or additionally, the communication systems 220 may include wireless interfaces that facilitate communication over wireless networks, such as wireless LANs, cellular networks, or WPANs.

Although not shown, the electronic device 102 can also include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

The PCBA 202 may further include, or be connected to, one or more sensors 222 disposed anywhere on or in the electronic device 102. In some examples, the sensors 222 may be disposed on or in a peripheral input device connected (e.g., wired, wirelessly) to the electronic device 102. The sensors 222 can include any of a variety of sensing components, such as an audio sensor (e.g., a wireless-network device), a touch-input sensor (e.g., a touchscreen), an image-capture device (e.g., a camera, video-camera), proximity sensors (e.g., capacitive sensors), an ambient light sensor (e.g., photodetector), and/or an under-display fingerprint sensor (UDFPS). The UDFPS can be implemented as an optical UDFPS or as an ultrasonic UDFPS. The UDFPS can be disposed within a housing of the electronic device 102, embedded underneath or within a display. In implementations, the PCBA 202 can include more than one UDFPS.

Further, the touch-input sensor may be implemented underneath or within a display. As described herein, a display utilizing one or more touch-input sensors is referred to herein as a touch-sensitive display. The touch-input sensor may be implemented as any of a 5-wire resistive touch panel, a surface capacitive touch panel, a projected capacitive (P-Cap) touch panel, a surface acoustic wave (SAW) touch panel, an infrared (IR) touch panel, a force touch sensor touch panel, and so on. The touch-input sensor may be a transparent substrate.

The electronic device 102 further includes a display 224 (e.g., display 106). Although an organic light-emitting diode (OLED) display is described herein, it is provided as an example only. The electronic device 102 may include or utilize any of a variety of displays, including an active-matrix OLED (AMOLED) display, an electroluminescent display (ELD), a microLED display, a liquid crystal display (LCD), a thin film transistor (TFT) LCD, an in-place switching (IPS) LCD, and so forth. The display 224 may be referred to as a screen, such that content may be displayed on-screen.

FIG. 3 illustrates an example implementation 300 of the display 224 from FIG. 2 in more detail. Although FIG. 3 shows various entities and components as part of the display 224, any of these entities and components may be separate from, but communicatively coupled to, the display 224.

In FIG. 3, the display 224 may include a cover layer 302 and a display module 304. The cover layer 302 may be composed of any of a variety of transparent materials including polymers (e.g., plastic, acrylic), glass (e.g., tempered glass), and so forth, forming any three-dimensional shape (e.g., polyhedron), such as a rectangular prism or cylinder. During manufacturing, a bottom face of the cover layer 302 may be bonded (e.g., glued) to the display module 304 to protect the display module 304 and serve as a barrier to ingress contaminants (e.g., dust, water).

The display module 304 may include a touch-input sensor 306 and a display panel 308. The display panel 308 may include a pixel array 310 of thousands (or millions) of pixel circuits (e.g., low-temperature polycrystalline oxide (LTPO) pixel circuits), forming any two-dimensional grid (e.g., rectangular grid, circular grid, curved grid). Each pixel circuit may include a light-emitting component, such as one or more light-emitting diodes (LEDs), commonly referred to as a pixel.

The display panel 308 may further include a display driver integrated circuit 312 (DDIC 312). The DDIC 312 may include a timing controller 314 and column line driver(s) 316. The column line driver 316 may include, as a non-limiting example, a data-line driver. The display panel 308 may further include row line drivers 318. The row line drivers 318 may include, as non-limiting examples, gate-line drivers, scan-line drivers, and/or emission-control drivers.

The display panel stack may further include, often integrated within the display module, but sometimes altogether separate of the display module, a collimator, one or more polarizer layers (e.g., polarization filters), one or more adhesive layers (e.g., glue), and a protective layer (e.g., an EMBO layer). The protective layer may include one or more layers, such as a polymer layer (e.g., polyethylene terephthalate (PET) substrate), a metallic layer (e.g., copper layer, stainless steel layer), a foam pad, and an adhesive layer. The protective layer may be on the bottom of the display panel stack (e.g., opposite the cover layer 302), providing protection from, for example, moisture, debris, and/or radiation (e.g., electromagnetic radiation, heat radiation).

FIG. 4 illustrates an example implementation 400 of the example electronic device 102 (e.g., wireless-network device 102-1) having the display 224 manufactured as a display panel stack. As illustrated in detail view 400-1, the electronic device 102 includes at one least layer of the display 224 (e.g., the cover layer 302) integrated as one or more portions of a housing of the electronic device 102. The display 224 includes an active area 404 that may be visible and/or accessible to touch by users.

Detail view 400-2 illustrates an exploded view of the display 224. For clarity in the detail view, some components of the display 224 may be omitted. As illustrated, the display 224 includes cover layer 302 disposed as a top layer and a display module 304 disposed thereunder. The display module 304 includes the touch-input sensor 306 disposed beneath the cover layer 302 and the display panel 308 disposed beneath the touch-input sensor 306.

In such a configuration, light emitting from the display panel 308 can pass through the touch-input sensor 306 and the cover layer 302 for viewing by users within the active area 404. Further, users can provide user input on or above the cover layer 302, within the active area 404, for receipt by one or more sensors. For example, users can provide user input on the cover layer 302, within the active area 404, for receipt (e.g., detection) by the touch-input sensor 306.

As described herein, user input may include any physical or behavioral characteristic provided (directly or indirectly) by a user from which biometric identifiers (e.g., biological characteristics) can be derived. As non-limiting examples, biometric identifiers can include fingerprints, irises, palms, voice, facial structure, and others.

FIG. 5 illustrates an example implementation 500 of the example electronic device 102 having an example touch-input sensor 306 configured to detect user input. As illustrated in detail view 500-1, a user provides user input in the form of a thumb 502 to the electronic device 102. For example, the user presses their thumb 502 on the display 224 (e.g., the cover layer 302) of the electronic device 102 within the active area 404. In some examples, the user may hover their thumb immediately above the display, such that no portion of the thumb 502 comes in contact with the display 224. In additional examples, the user may provide other, or additional, user input including other fingers, a palm, and so on.

In this example, as illustrated in detail view 500-2, the touch-input sensor 306 detects the thumb 502 pressed upon the display 224. The touch-input sensor 306, in an example, may detect the thumb 502 using capacitive touch technology. For example, a controller and/or processor can monitor a conductive matrix (e.g., diamond grid layout, interleaved layout, angled cross pattern layout) by scanning electrical charges or voltages within the matrix to detect variations therein and, thereby, identify a touch input. The touch-input sensor 306 using capacitive touch technology may allow for sub-frame digitization, providing higher resolution, higher precision, and quicker response times than other touch-based technology.

In some examples, the biometric authentication manager 216 may be configured to analyze touch inputs received at the touch-input sensor 306 and identify touch-input false positives. Touch input false positives may include any unintentional, or undesired, input received at the touch-input sensor 306 of the electronic device 102. For example, the display 224 of the electronic device 102 in a pocket of the user's clothing may come in contact with fabric, activating the touch-input sensor 306. In another example, a user may reach into a pocket to grab their electronic device 102 and place it down on a table, touching the display 224 without the desire to authenticate themself. In these and other examples, the biometric authentication manager 216 may be configured to analyze touch inputs received at the touch-input sensor and identify false positives based on a number of events or characteristics, including a duration of sustained contact of the user input with the display 224, an orientation or acceleration of the electronic device 102, a motion of the user input across the display 224, a size of the user input on the display 224, and so forth. The biometric authentication manager 216 may use one or more of machine-learned techniques, heuristic algorithms, or any other algorithms to analyze and identify touch-input false positives.

As illustrated in detail view 500-3, before, during, and/or after the biometric authentication manager 216 attempts to identify touch input false positives, the touch-input sensor 306 generates a heatmap 504. The heatmap 504 may include a measurement of a capacitive coupling of user input, indicating an area of sustained contact ("contact area") between the thumb 502 and the display 224. As described herein, sustained contact may be any duration of time sufficient for the electronic device 102, or components therein (e.g., the touch-input sensor 306), to register, process, and/or analyze user input.

In implementations, one or more regions 506 within the heatmap 504 may indicate no contact area. Alternatively, one or more regions within the heatmap 504 may indicate a contact area ("contact region 508") of varying magnitudes, correlating to, as non-limiting examples, a magnitude of pressure applied by the thumb 502 on the display 224, a degree of coverage of the thumb 502 on the display 224, and so on.

In aspects, responsive to and based on the heatmap 504, the biometric authentication manager 216 is configured to outline the contact region 508 and generate a shape corresponding to the contact area. For example, the biometric authentication manager 216 having a line drawing algorithm (e.g., a heuristic algorithm, a machine-learned algorithm) is configured to trace one or more lines, outlining the contact region 508 and generating a shape corresponding to the contact area. The algorithm can further be configured to generate a plurality of shapes corresponding to multiple contact regions. The biometric authentication manager 216 can implement the line drawing algorithm depending on a resolution of the heatmap 504 produced by the touch-input sensor 306.

In additional aspects, responsive to and based on the heatmap 504, the biometric authentication manager 216 can process (e.g., image processing) the heatmap 504. Processing performed by the biometric authentication manager 216 can denoise, blur, deblur, sharpen, edge detect, and so forth the heatmap 504. In implementations, the biometric authentication manager 216 can employ a convolution filter configured to use local neighbors to compute a weighted average and, thereby, adjust the heatmap 504. For instance, the convolution filter can implement a gaussian blur to reduce noise in the heatmap. As an example, the convolution filter may replace the magnitude of a point with a magnitude value computed with an eight neighbors magnitude value. In an additional example, the biometric authentication manager 216 can implement a nearest neighbor algorithm to determine an overlap. In another example, the biometric authentication manager 216 may include a machine-learned module configured to process the heatmap 504.

After processing the heatmap 504, the biometric authentication manager 216 may generate an isosurface. For example, the biometric authentication manager 216 may pass the heatmap 504 to processors 204, an IC, or a SoC to generate a hardware-accelerated isosurface for rapid input/output testing (e.g., using a very high-speed integrated circuit hardware description language (VHDL)). The isosurface may be generated and/or processed using any combination of interpolation, thresholding, alpha-blending, and so forth. In addition, the biometric authentication manager 216 may employ an algorithm (e.g., painter's algorithm) configured to identify one or more shapes of interest.

Through any combination of the line drawing algorithm, the processing techniques, the isosurface generation, and/or the shape identification, the biometric authentication manager 216 can generate one or more shapes corresponding to one or more contact areas. In some examples, the shapes may be morphous, forming regular two-dimensional shapes. In additional examples, the shapes may be amorphous, forming irregular two-dimensional shapes. In both examples, one or more of the shapes may substantially match the one or more contact areas, defining similar shapes or congruent shapes.

Further to the above descriptions, the biometric authentication manager 216 can be configured to resize one or more shapes. For example, the biometric authentication manager 216 can resize a shape, such that the shape is still similar to a corresponding contact area, but smaller in area. In so doing, a first contour of the shape may be within a second contour of the corresponding contact area. As a result, the first contour of the shape may be offset from the second contour by a predetermined distance (e.g., between one and twenty pixels). This predetermined distance may be based on a number of factors including, as non-limiting examples, a measurement of ambient light in an environment within which the electronic device 102 resides, an amount of potential light leakage from the display 224, a current brightness setting of the display 224, a determined curvature of the user input (e.g., thumb 502), a curvature of the display 224, a directly proportional relationship between a leakage of light (e.g., an acceptable level of light leakage) and the contact area, and so on. In at least some implementations, the biometric authentication manager 216 may forgo resizing the one or more shape depending on an ambient luminance, a luminosity of the display, and/or a size and shape of the contact area.

Further, the biometric authentication manager 216 can identify one or more locations of user input (e.g., thumb 502) on the display 224, as detected by the touch-input sensor 306, and determine one or more regions ("determined regions") within the pixel array 310 having one or more pixel circuits corresponding to (e.g., within, underneath, near) the one or more locations of the user input on the display 224 (e.g., contact area). For example, collocation may include, or be established by, centroid coordinates of one determined region being within a second contour of a corresponding contact area, matching centroid coordinates between one determined region and a corresponding contact area, and so on.

In additional examples, the biometric authentication manager 216 can generate a shape that is not similar nor congruent to a corresponding contact area. For instance, the biometric authentication manager 216 may approximate a shape for a corresponding contact area. As an example, the biometric authentication manager 216 may approximate a contact area as being substantially oval. In another example, depending on a size, location, and/or type of the user input, the biometric authentication manager 216 may use a preset shape (e.g., a circle, a rectangle) that fits within a second contour of a corresponding contact area.

Figure 6:
FIG. 6 illustrates an example implementation of an example display panel in which spatially-configurable localized illumination for spoof detection by biometric authentication systems can be implemented.

FIG. 6 illustrates an example implementation 600 of an example display panel in which spatially-configurable localized illumination for spoof detection by biometric authentication systems can be implemented. In this example, the display panel 308 includes similar components to those described and illustrated with respect to the display panel 308 of FIG. 3, with some additional detail. The display panel 308 can include additional components, which are not illustrated in FIG. 6. Further, in other implementations, the electronic device 102 may utilize display technology altogether different than the display panel 308.

The display panel 308 includes the pixel array 310 having pixel circuits 602 (e.g., pixel circuit 602-1, pixel circuit 602-2). The pixel array may include a plurality (e.g., hundreds, thousands, millions) of pixel circuits 602, but only fifteen pixel circuits 602 are illustrated in FIG. 6 for sake of clarity and conciseness. The pixel circuits 602 are operably coupled to drivers (e.g., row line drivers 318, column line driver 316). For example, the pixel circuits 602 are operably coupled to row line drivers 318 (e.g., row line driver 318-1, row line driver 318-2) via row lines 604. Further, the pixel circuits 602 are operably coupled to the column line driver 316 via column lines 606. Although two row line drivers 318 are illustrated and only one column line driver 316 is illustrated, the display panel 308 may include a plurality of row line drivers 318 and column line drivers 316. As non-limiting examples, the row line drivers 318 may be implemented as gate line drivers, scan line drivers, and/or emission control drivers. As a non-limiting example, the column line driver 316 may be implemented as a data line driver.

The display panel 308 further includes the DDIC 312 having the column line driver 316 and the timing controller 314. The timing controller 314 can provide interfacing functionality between the processors 204 and the drivers (e.g., column line driver 316, row line drivers 318). The timing controller 314 generally accepts commands and data from the processors 204, generates signals with appropriate voltage, current, timing, and demultiplexing, and passes the signals to the drivers.

The drivers may pass time-variant and amplitude-variant signals (e.g., voltage signals, current signals) to one or more pixel circuits 602 in the pixel array 310 via row lines and/or column lines. For example, a data line driver passes signals containing voltage data to the pixel array 310 to control the luminance of one or more LEDs in the pixel circuits 602. A scan line driver passes a signal to enable or disable one or more LEDs from receiving the data voltage from the data line driver. An emission control driver supplies an emission control signal to the pixel array 310. Together, the drivers control the pixel array 310 to generate light to create an image on the display panel 308.

In aspects, based on one or more shapes generated by the biometric authentication manager 216, the biometric authentication manager 216 instructs (e.g., directly, indirectly via processors 204) the DDIC 312 to alter a brightness at the one or more determined regions within the pixel array 310 of the display panel 308. In some examples, altering a brightness may include increasing a luminance of one or more determined regions, while maintaining a luminance of the display for regions around the determined regions. For example, under the instruction of the biometric authentication manager 216, the DDIC 312 can increase the luminosity of individual LEDs within the one or more regions from a low brightness to a high brightness.

FIG. 7 illustrates an example implementation 700 of the example electronic device 102 having the display panel 308 configured to implement spatially-configurable localized illumination for spoof detection by biometric authentication systems. As illustrated in detail view 700-1, the user provides user input in the form of the thumb 502 to the electronic device 102. As illustrated in detail view 700-2, the touch-input sensor 306 (not illustrated) detects the thumb 502 pressed upon the display 224 and generates a heatmap 504 with the contact region 508 indicative of the contact area. Based on the generated heatmap 504 and the contact region 508, the biometric authentication manager 216 generates a shape corresponding to the contact area. The biometric authentication manager 216 further identifies a location of the thumb 502 on the display 224 (e.g., contact area), as detected by the touch-input sensor 306, and determines a region ("determined region") within the pixel array 310 having one or more pixel circuits corresponding to the location of the thumb 502 on the display 224.

As illustrated in detail view 700-3, the biometric authentication manager 216 instructs the DDIC 312 to alter a brightness of the determined region in the display panel 308, increasing the luminance of the LEDs in the determined region. As described herein, a determined region of one or more pixel circuits corresponding to a location of a user input on or above the display 224 in which a luminance or color of light may be altered (e.g., increased luminance, increased one or more wavelengths of light) is referred to as a high-luminance region. Further, it should be understood to one skilled in the art that the high-luminance region may include one or more portions that may not increase in luminosity. A high-luminance region 702 may be collocated with and similar in shape to the contact area between the thumb 502 and the display 224. The luminosity of the high-luminance region 702, expressed in candela per square meter ("nit"), may be hundreds to thousands of nits greater in luminosity than other portions of the display panel ("background region") during biometric authentication. For example, a high-luminance region may start at a luminosity of 200 nits and increase to a luminosity of 1300 or more nits. A background region (e.g., a non-high-luminance region) surrounding the high-luminance region may be configured to retain, or reduce, the starting luminosity value of zero nits (e.g., a dark mode).

In so doing, during biometric authentication, the thumb 502 may experience amplified illumination from the high-luminance region 702. Furthermore, due to the high-luminance region 702 being collocated and similarly shaped to the thumb 502, light radiating from the high-luminance region 702 can be sufficiently covered by the thumb 502 so as to minimize potential light leakage visible to users, increasing user experience.

Light incident at the skin surface of the thumb 502 experiences reflection and scattering. The reflected light from the skin surface of the thumb 502 may be directly proportional to the amount of light irradiating thereupon. Utilizing the reflected light, a biometric authentication system having (e.g., communicatively coupled to) one or more of the sensors 222, such as a fingerprint sensor, can capture an image of the thumb 502.

Figure 8:
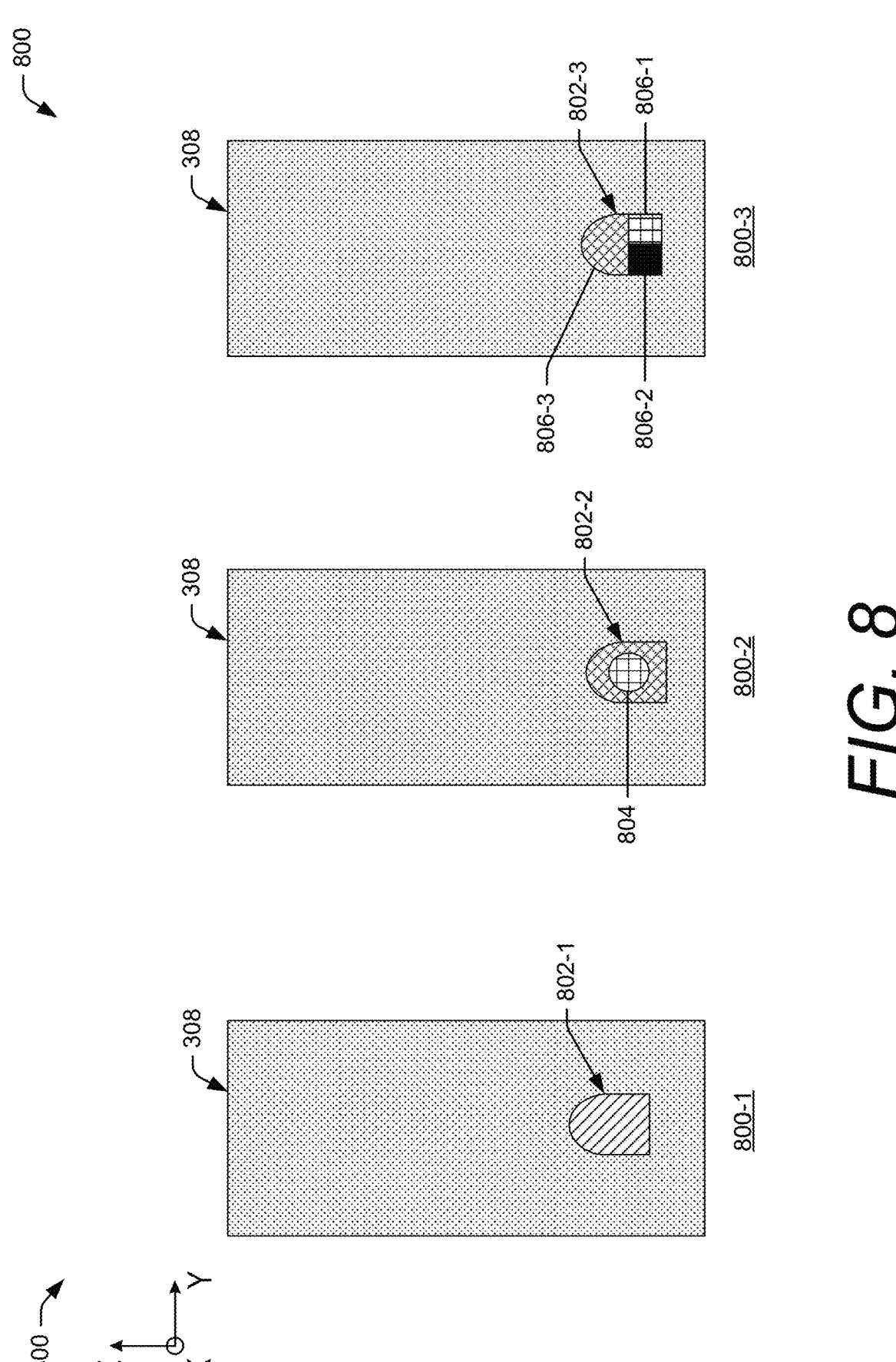
FIG. 8 illustrates another example implementation of the example electronic device having the display panel configured to implement spatially-configurable localized illumination for spoof detection by biometric authentication systems.

FIG. 8 illustrates another example implementation 800 of the example electronic device 102 having the display panel 308 configured to implement spatially-configurable localized illumination for spoof detection by biometric authentication systems. In additional implementations, as illustrated in FIG. 8, the biometric authentication manager 216 can instruct the DDIC 312 to alter a luminosity and color of light emitting from a high-luminance region 802-1 in the display panel 308. For example, illustrated in detail view 800-1, the biometric authentication manager 216 may instruct the DDIC 312 to alter a color of light emitting from the high-luminance region 802-1 so that the high-luminance region 802-1 emits one or more colors and/or shades, or a combination thereof. For instance, the biometric authentication manager 216 may cause the high-luminance region 802-1 to emit red, green, blue, cyan, magenta, and other colors and/or shades of light. In further implementations, the biometric authentication manager 216 may cause the high-luminance region 802-1 of the display panel 308 to emit one or more electromagnetic waves of other frequencies, including infrared rays, which may not be visible to human sight (e.g., greater than 700 nanometers).

Through such techniques, the biometric authentication manager 216 may amplify characteristics of the user input (e.g., ridges and valleys of a finger) by altering a color of light emitting from the high-luminance region 802-1. Further, depending on the detection band (e.g., a peak detection) of a biometric authentication sensor (e.g., an under-display fingerprint sensor), the biometric authentication manager 216 may facilitate biometric authentication by altering the color of light emitting from the high-luminance region 802-1.

In addition, as illustrated in detail view 800-2, the biometric authentication manager 216 may cause one or more portions within the high-luminance region 802-2 to emit light of varying colors or luminosities. For example, a portion 804 of the high-luminance region 802-2 may emit red light at a luminosity of 1200 nits, while other portions of the high-luminance region may emit white light at a luminosity of 1000 nits. In another example, the portion 804 of the high-luminance region 802-2 may not emit light ("dark portion") while other portions of the high-luminance region may emit green light at a luminosity of 1100 nits. In so doing, the biometric authentication manager 216 may further amplify characteristics of the user input through a shadowing effect caused by the dark portion. For example, light incident at skin tissue of a human finger may optically respond (e.g., scatter, absorb) differently than light incident at a spoof finger composed of, as non-limiting examples, plastic, paper, and so on. As a result, skin tissue may exhibit optical characteristics dissimilar to optical characteristics of spoof fingers.

Further, as illustrated in detail view 800-3, the biometric authentication manager 216 may cause the high-luminance region 802-3 to emit light in temporally variable patterns. For example, during biometric authentication, the biometric authentication manager 216 may configure the high-luminance region 802-3, or portions thereof, to emit light for hundreds of microseconds to tens of seconds depending on a number of factors, including processing speeds of an electronic device 102, a VLT of a cover layer (e.g., cover layer 302), a cleanliness of the thumb 502, and so on. During that time, the biometric authentication manager 216 may temporally and/or spatially alter a luminosity and/or color of light emitting from one or more portions of the high-luminance region 802-3. For example, for a first interval, the biometric authentication manager 216 may cause a first portion 806-1 of the high-luminance region 802-3 to emit green light at a luminosity of 1000 nits, a second portion 806-2 of the high-luminance region 802-3 to not illuminate (e.g., remain dark), and a third portion 806-3 of the high-luminance region 802-3 to emit white light at a luminosity of 1200 nits. For a second interval (not illustrated), the biometric authentication manager 216 may cause the first portion 806-1 of the high-luminance region 802-3 to emit red light at a luminosity of 1100 nits, a second portion 806-2 of the high-luminance region 802-3 to emit green light at a luminosity of 1100 nits, and a third portion 806-3 of the high-luminance region 802-3 to emit white light at a luminosity of 1100 nits. Through such techniques, the biometric authentication manager 104 can implement spatially, temporally, and/or chromatically variable illumination on the display 106 for spoof detection by the biometric authentication system. In so doing, the biometric authentication manager 216 may mitigate high-luminance light leaking from around the user input, impairing or frustrating the user, and may further amplify characteristics of the user input usable for spoof detection.

FIG. 9 illustrates an example implementation 900 of the example electronic device 102 including a biometric authentication system having a fingerprint sensor configured to receive a reflection of user input illuminated by spatially-configurable localized illumination for spoof detection. As illustrated, the electronic device 102 includes an optical UDFPS 902 disposed in a bottom portion of the display 224 within the housing of the electronic device 102. As illustrated, the optical UDFPS 902 may be integrated in one or more layers of the display 224. Although the optical UDFPS 902 is described as being disposed in the bottom portion of the display 224, the optical UDFPS 902 may be disposed in any portion of the display 224.

In such a configuration, the optical UDFPS 902 can capture light reflected from the thumb 502 and transmitted through the display 224. The biometric authentication manager 216 can then generate (e.g., capture) a frame ("verify print") containing a visual representation of the thumb 502 having a fingerprint. The biometric authentication manager 216 can then, using one or more algorithms, compare the verify print to an enrolled print of a previously authenticated user and generate an authenticity score. For example, the biometric authentication manager 216 can compare the verify print to the enrolled print based on whether information (e.g., biometric identifiers, minutia, ridges, and valleys) inferred from the prints match. As described herein, the comparison of the verify print to the enrolled print may be referred to as an authenticity comparison.

Before, during, or after the authenticity comparison, the biometric authentication manager 216 may further determine liveness through analysis of the characteristics of the user input as captured and visually represented in the verify print. One or more algorithms may be configured to calculate a liveness score based on the verify print.

In an implementation, the biometric authentication manager 216 may utilize a machine-learned model, such as a convolution neural network (CNN), for one or more of a static feature extraction, dynamic feature extraction, and texture feature extraction in the verify print and determine liveness. For example, the machine-learned model may be iteratively trained, off-device, to identify live fingers based on optical characteristics of skin tissue (e.g., skin spectroscopy). Through such training, the machine-learned model can reject spoof fingers if the verify print exhibits optical characteristics dissimilar to optical characteristics of live fingers. To enhance the determination of liveness by the machine-learned model, the biometric authentication manager 216 may utilize the spatially, temporally, and/or chromatically variable illumination of the high-luminance region 802 on the display 106. For example, the biometric authentication manager 216, using a red color to illuminate user input, may identify optical characteristics indicative of a light absorption rate dissimilar to that of skin tissue, or at least dissimilar to that of skin tissue of the previously authorized (e.g., enrolled) user. Further to the above descriptions, the machine-learned model can be trained with numerous spatially, temporally, and/or chromatically variable illumination patterns, including animation sequences, to further enhance liveness determination.

In another implementation, the biometric authentication manager 216 may be configured to determine liveness based on skin tone. In addition, the biometric authentication manager 216 may be configured to determine liveness based on pulse oximetry measurements using the spatially, temporally, and/or chromatically (e.g., red, green) variable illumination of the high-luminance region 802 on the display 106.

In addition to the above descriptions, if the UDFPS 902 is a monochrome sensor, the UDFPS 902 can be configured to capture red, green, and blue in a single scan line using, for example, a frame sequential technique. In so doing, the biometric authentication manager 216 can perform a red, green, and blue assessment after a single scan line as opposed to a red, green, and blue (RGB) assessment after three scan lines, and thereby reduce biometric authentication time.

The biometric authentication manager 216 may then fuse the liveness score and the authenticity score. If the one or more scores, or the fusion thereof, meet or exceed a predetermined threshold, then the biometric authentication manager 215 can authenticate the user. The biometric authentication manager 216 may then permit the user access (e.g., unlock) one or more resources (e.g., a program, an internet-enabled account, a peripheral input device, an operating system) of the electronic device 102.

Although techniques have been described herein in reference to, or for use by, an optical UDFPS, at least some of the aforementioned techniques can also be implemented with any of a variety of biometric sensors, including an ultrasonic fingerprint sensor. For example, the biometric authentication manager 216 can be configured to generate a shape corresponding to a contact area, using any touch-input sensor, and enable an ultrasonic fingerprint sensor to more quickly and reliably locate user input. Further, although techniques have been described herein in reference to, or for use by, biometric authentication systems, the techniques can be applied to any of a variety of other contexts outside of biometric authentication. Additionally, although techniques have been described herein in reference to, or for use by, a single electronic device (e.g., electronic device 102), the techniques are not limited to being implemented only on one electronic device.

Example Methods

FIGS. 10 and 11 depict methods 1000 and 1100, respectively, that enable spoof detection using spatially-configurable localized illumination for biometric authentication systems. These methods are shown as sets of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion reference may be made to the example implementation 100 of FIG. 1 and entities detailed in FIGS. 2-9, reference to which is made for example only. The techniques are not limited to performance by one entity or multiple entities operating on one device. Method 1100 is supplemental to, and is optionally performed in conjunction with, the method 1000.

At 1002, a biometric authentication system receives a fingertip touch input from a user, the fingertip touch input in sustained contact with a touch-sensitive display. For example, user input, including a thumb (e.g., thumb 502), of a user may come in sustained contact with a touch-sensitive display (e.g., display 224). A touch-input sensor (e.g., touch-input sensor 306) may receive (e.g., detect) the user input.

At 1004, the biometric authentication system determines, responsive to receiving the fingertip touch input, a contact area of the sustained contact with the touch-sensitive display. For example, a biometric authentication manager (e.g., biometric authentication manager 216), using any of a variety of algorithms (e.g., machine-learned techniques, convolution filters), determines a shape corresponding to the contact area. The shape may be regular or irregular, being substantially similar, or even congruent, with the contact area.

At 1006, the biometric authentication system alters, responsive to determining the contact area of the sustained contact, a color of light emitted by one or more portions of the touch-sensitive display at the contact area. For example, the biometric authentication manager instructs a DDIC (e.g., DDIC 312) to alter a color of light from a portion of the region within the display panel to produce a red light. In an additional example, the biometric authentication manager instructs the DDIC to increase a brightness of a region (e.g., high-luminance region 702) within a display panel (e.g., display panel 308) collocated with the contact area. Altering the luminosity and/or the color is effective to facilitate fingerprint sensing by the biometric authentication system, enhance authenticity determination, and/or enhance liveness determination. In at least some implementations, the one or more portions of the touch-sensitive display at the contact area may extend beyond the contact area. For example, one or more portions may form a loop (e.g., a colored ring) around the contact area (e.g., the fingertip touch input) to enhance user experience and/or illuminate more of the user input.

Altering the color of light may include illuminating a portion of the contact area with light having a first color for a first interval, and then illuminating the portion of the contact area with light having a second color for a second interval. In this way, the altering may be temporal (e.g., change over time) such that a portion of the contact area is illuminated with different colors of light over chronological intervals. Altering the color of light may also include illuminating a first portion of the contact area with light having a first color and illuminating a second portion of the contact area with light having a second color. In this way, the altering may be spatial (e.g., changes with respect to position on the display) such that different spatial portions of the contact area are illuminated with different colors of light. In implementations, the altering can also be both temporal and spatial. The fingertip touch input in contact with a touch-sensitive display may be a fingertip touch input in sustained contact with the touch-sensitive display. In further implementations, altering the luminosity of light may be both temporal and spatial.

At 1008, the biometric authentication system receives a fingerprint reflection of the fingertip touch input, the fingerprint reflection being a reflection from the fingertip touch input caused by the altered color of light emitted from the one or more portions of the touch-sensitive display at the contact area. For example, the optical UDFPS captures reflected light from the thumb. The biometric authentication manager can then generate a verify print containing a visual representation of the thumb having a fingerprint.

At 1010, the biometric authentication system determines, based on the received fingerprint reflection, that the fingerprint reflection of the fingerprint touch input indicates a live, human finger. For example, the biometric authentication manager can, using one or more algorithms, determine a liveness of the user input. Further, the biometric authentication manager can compare a verify print to an enrolled print based on whether information inferred from the prints match. Based on the determination, the biometric authentication manager can authenticate the user.

As mentioned, the biometric authentication system may implement spoof detection using spatially-configurable localized illumination based on an optional method 1100 described with respect to FIG. 11. At 1102, a biometric authentication system receives a second fingertip touch input from the user, the second fingertip touch input in a second sustained contact with the touch-sensitive display. For example, user input of a user, such as a pointer finger and an index finger, may come in sustained contact with the touch-sensitive display. The touch-input sensor may receive (e.g., detect) the user input, including the pointer finger and the index finger.

At 1104, the biometric authentication system determines, responsive to receiving the second fingertip touch input, a second contact area of the second sustained contact with the touch-sensitive display. For example, the biometric authentication manager, using any of a variety of algorithms (e.g., machine-learned techniques, convolution filters), determines a second shape corresponding to the second contact area. The second shape may be regular or irregular, being substantially similar, or even congruent, with the second contact area.

At 1106, the biometric authentication system alters, responsive to determining the second contact area of the sustained contact, a second color of light emitted by a second one or more portions of the touch-sensitive display at the second contact area. For example, the biometric authentication manager instructs a DDIC (e.g., DDIC 312) to alter a color of light from a portion of the region within the display panel to produce a red light. In an additional example, the biometric authentication manager instructs the DDIC to increase a brightness of a region (e.g., high-luminance region 702) within a display panel (e.g., display panel 308) collocated with the contact area. Altering the luminosity and/or the color is effective to facilitate fingerprint sensing by the biometric authentication system, enhance authenticity determination, and/or enhance liveness determination.

At 1108, the biometric authentication system receives a second fingerprint reflection of the second fingertip touch input, the second fingerprint reflection being a second reflection from the second fingertip touch input caused by the second color of light emitted from the second one or more portions of the touch-sensitive display at the second contact area. For example, the optical UDFPS captures the second reflected light from the index finger. The biometric authentication manager can then generate a second verify print containing a visual representation of the index finger having a second fingerprint.

At 1110, the biometric authentication system determines, based on the received second fingerprint reflection, that the second fingerprint reflection of the second fingertip touch input indicates a second live, human finger. For example, the biometric authentication manager can, using one or more algorithms, determine a liveness of the user input. Further, the biometric authentication manager can compare a second verify print to an enrolled print based on whether information inferred from the prints match. Based on the second determinations, the biometric authentication manager can authenticate the user.

Example Implementations

Figure 12:
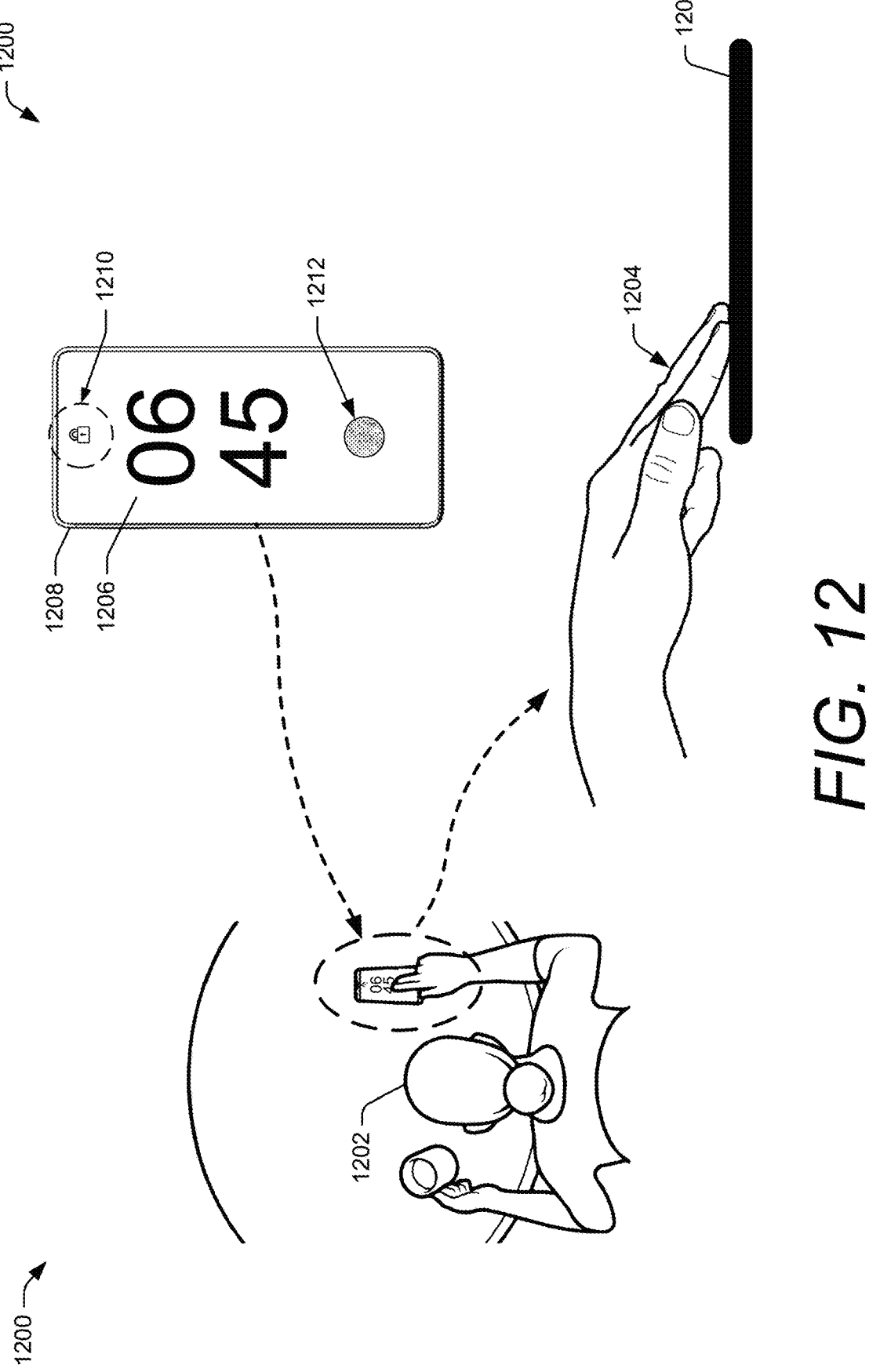
FIG. 12 illustrates an example implementation of an example electronic device configured to implement spoof detection using spatially-configurable localized illumination for biometric authentication systems.

FIG. 12 illustrates an example implementation 1200 of an example electronic device configured to implement spoof detection using spatially-configurable localized illumination for biometric authentication systems. The example implementation illustrates a user 1202 providing user input 1204, such as two fingertips, at a display 1206 (e.g., display 224) of an electronic device 1208 (e.g., electronic device 102) to authenticate herself In this particular example, the user 1202 is attempting to authenticate herself to an operating system of the electronic device 1208.

In aspects, the electronic device 1208 may start in a locked state 1210 prior to the user providing user input 1204. In the locked state 1210, the electronic device 1208 may display a prompt to the user 1202 requesting she provide user input 1204, including touch input, in order to authenticate herself. The prompt may be an on-screen icon 1212 indicating a method of biometric authentication, such as fingerprint authentication.

Figure 13:
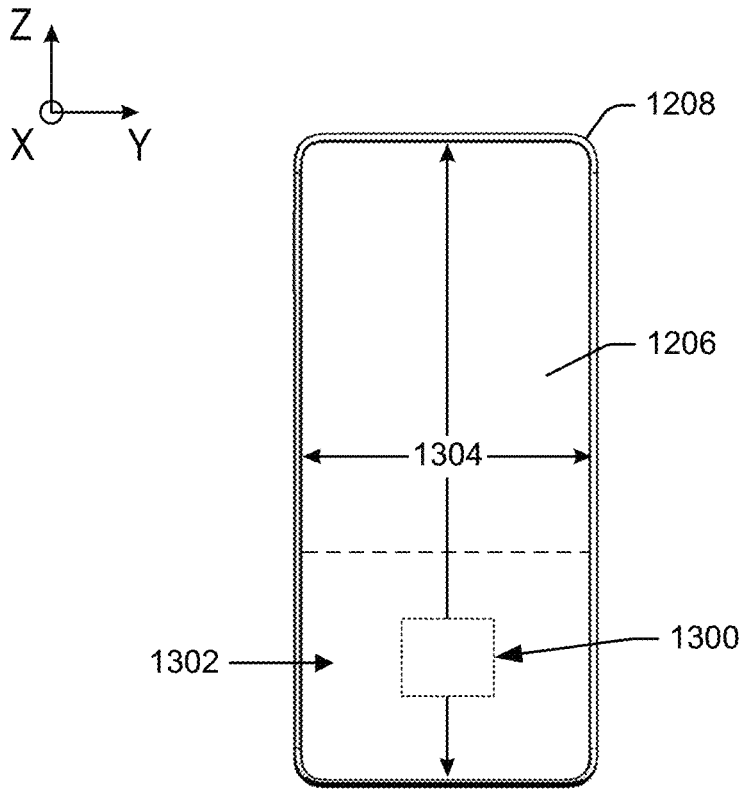
FIG. 13 illustrates the example electronic device having an optical under-display fingerprint sensor (UDFPS) in a bottom portion of an active area of the display from FIG. 11.

In continuation of the previous example, FIG. 13 illustrates the example electronic device 1208 having an optical UDFPS 1300 (e.g., optical UDFPS 902) in a bottom portion 1302 of an active area 1304 of the display 1206 from FIG. 12. The optical UDFPS 1300 may be disposed underneath all layers of the display 1206. In such a configuration, a user 1202 may provide user input 1204 anywhere within the bottom portion 1302 of the active area 1304 so that the optical UDFPS 1300 can capture an image of the user input 1204.

Turning back to FIG. 12, momentarily, responsive to the electronic device 1208 displaying the prompt, the user 1202 may provide user input 1204 by touching two fingertips on the display 1206 within the bottom portion 1302 of the active area 1304. In one example, if the user 1202 sustains the touch input, a biometric authentication manager (e.g., biometric authentication manager 216) may determine, at least in part, that the touch input is not a false positive. Concurrent with, or in response to, the determination that the touch input is not a false positive, a touch-input sensor (e.g., touch-input sensor 306) may generate a heatmap (e.g., heatmap 504).

Figure 14:
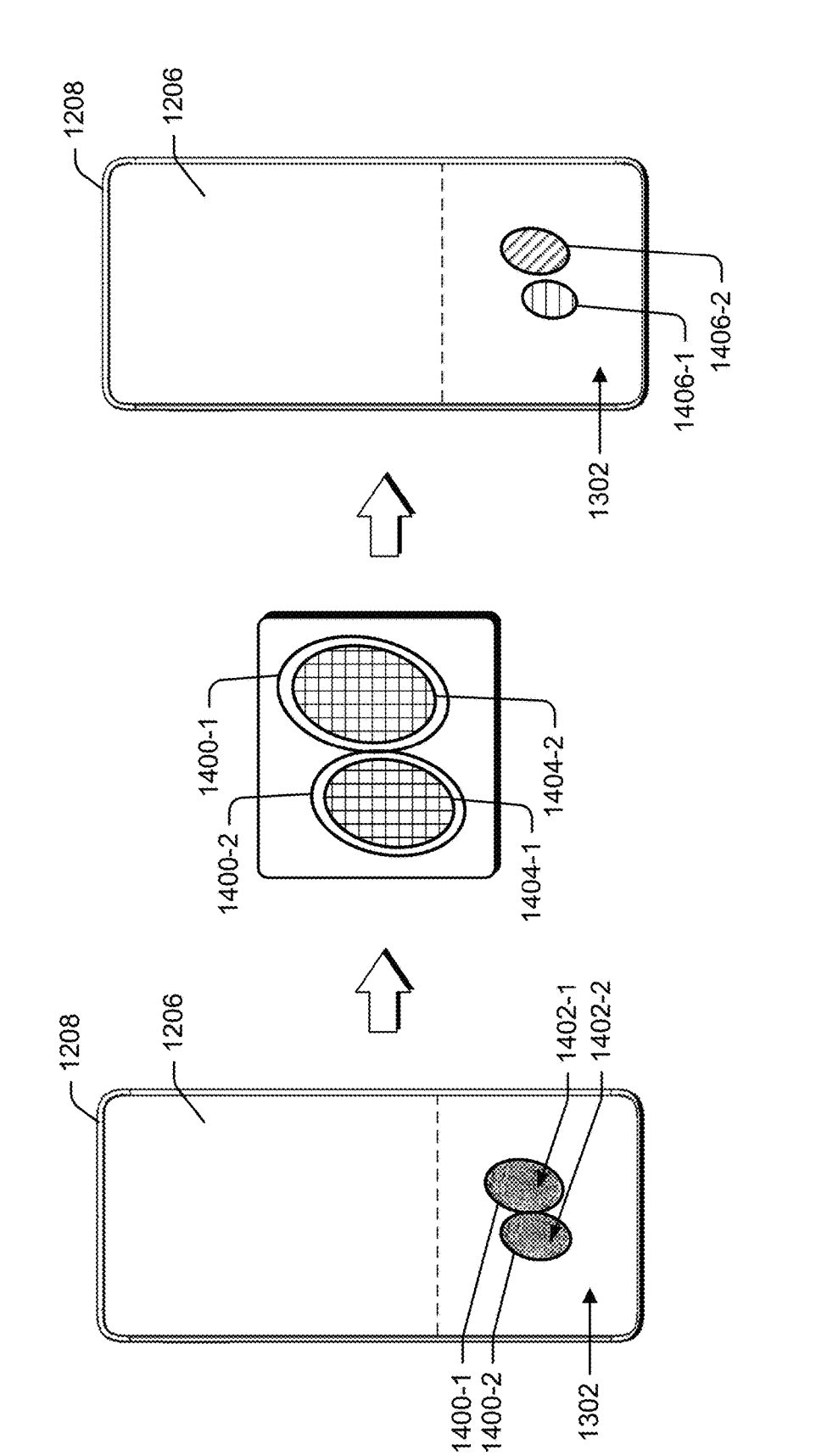
FIG. 14 illustrates example techniques of determining a shape and location of user input to provide spatially-configured localized illumination.

Continuing with this example, FIG. 14 illustrates example techniques of determining a shape and location of user input 1204 to provide spoof detection using spatially-configured localized illumination. In aspects, the biometric authentication manager may determine shapes for the user input 1204 in contact with the display, including two shapes 1400 (e.g., shape 1400-1, shape 1400-2) outlining the two fingertips having fingerprints 1402 (e.g., fingerprint 1402-1, fingerprint 1402-2), respectively. In at least some implementations, the biometric authentication manager may resize the two shapes 1400 to two smaller shapes 1404 (e.g., shape 1404-1, shape 1404-2) by reducing an area of the two shapes 1400. Based on the two smaller shapes 1404, the biometric authentication manager may instruct a DDIC (e.g., DDIC 312) to generate high-luminance regions 1406 (e.g., high-luminance region 1406-1, high-luminance region 1406-2) on the display 1206 collocated with and similar to a contact area between the two fingertips and the display 1206. Further, the biometric authentication manager may instruct the DDIC to cause the pixels (e.g., organic light-emitting diodes) within one or more portions of the high-luminance regions 1406 to generate high-luminance light of varying colors and luminosities. For example, as illustrated in FIG. 14, high-luminance region 1406-1 may emit green light at a luminosity of 1200 nits, while high-luminance region 1406-2 may emit red light at a luminosity of 1000 nits. In this way, spatially, temporally, and/or chromatically variable light from the high-luminance regions can illuminate the user input to facilitate fingerprint sensing by the optical UDFPS and enhance spoof detection. If the biometric authentication manager can authenticate the user through analysis of the fingerprints and validate liveness of the user input, then the biometric authentication manager can transfer the electronic device 1208 from the locked state 1210 to an unlocked state.

Figure 15:
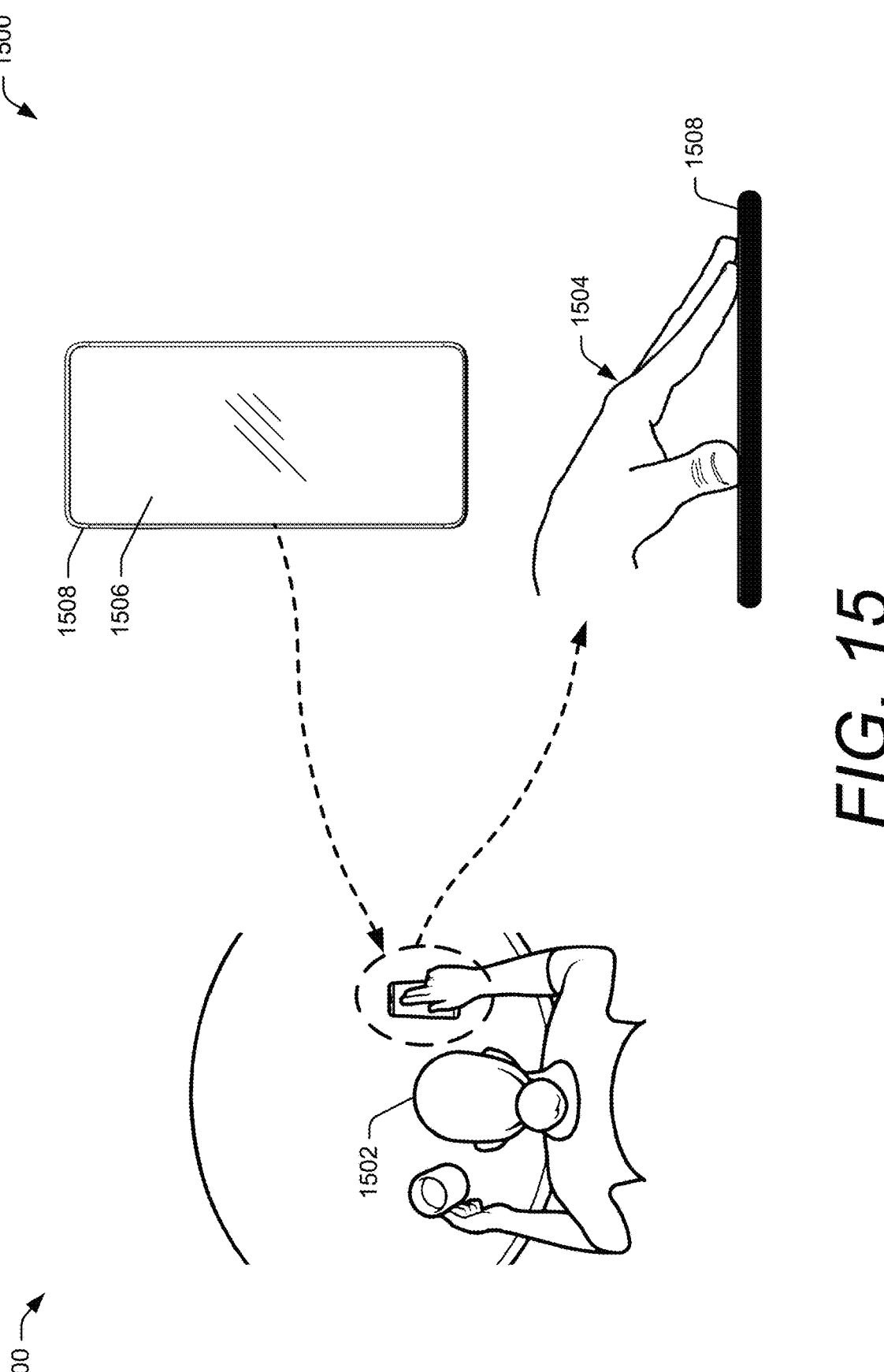
FIG. 15 illustrates another example implementation of an example electronic device configured to implement spatially-configurable localized illumination for biometric authentication systems.

FIG. 15 illustrates another example implementation 1500 of an example electronic device configured to implement spatially-configurable localized illumination for biometric authentication systems. The example implementation illustrates a user 1502 providing user input 1504, such as three fingertips, at a display 1506 (e.g., display 224) of an electronic device 1508 (e.g., electronic device 102) to authenticate herself In this particular example, the user 1502 is attempting to authenticate herself to an operating system of the electronic device 1508.

In aspects, the electronic device 1508 may start in a locked state prior to the user 1502 providing user input 1504. In the locked state, the display 1506 of the electronic device 1508 may be dark (e.g., a black screen, a blank screen). In order to transfer the electronic device 1508 from the locked state to an unlocked state, the user 1502 may provide user input 1504, including touch input, in order to authenticate herself.

Figure 16:
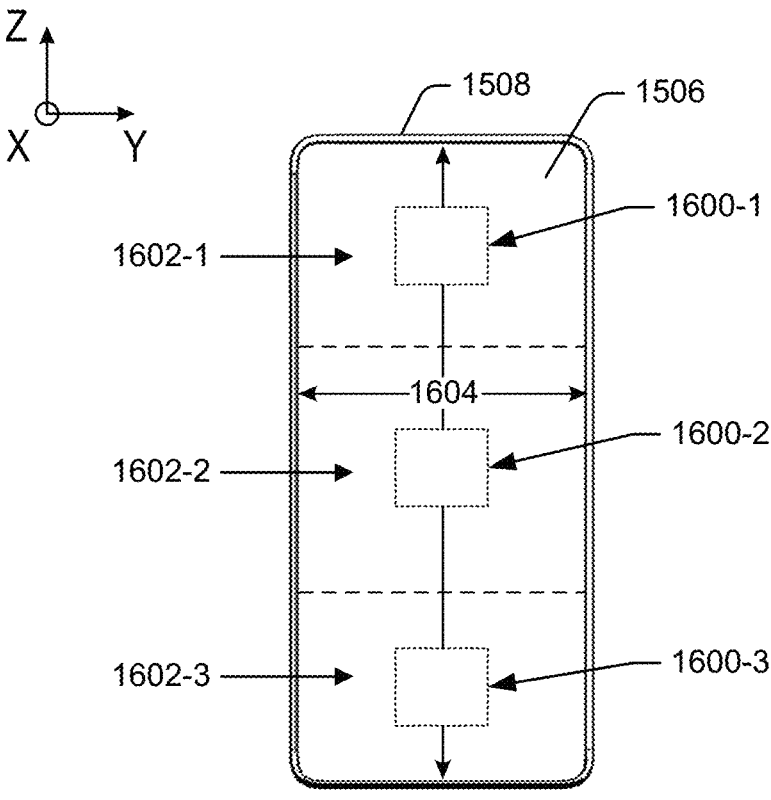
FIG. 16 illustrates the example electronic device having an optical UDFPS in a bottom portion of an active area of the display from FIG. 14.

In continuation of the previous example, FIG. 16 illustrates the example electronic device 1508 having an optical UDFPS 1600 (e.g., optical UDFPS 1600-1, optical UDFPS 1600-2, optical UDFPS 1600-3) for each portion 1602 (e.g., a top portion 1602-1, a middle portion 1602-2, a bottom portion 1602-3) of an active area 1604 of the display 1506 from FIG. 15. At least one optical UDFPS 1600 may be disposed underneath all layers of the display 1506. In such a configuration, a user 1502 may provide user input 1504 anywhere within the active area 1604 so one or more optical UDFPS 1600 can capture an image of the user input 1504.

Turning back to FIG. 15 the user 1502 may provide user input 1504 by touching three fingertips on the display 1506 within the active area 1604. In one example, if the user 1502 sustains the touch input, a biometric authentication manager (e.g., biometric authentication manager 216) may determine, at least in part, that the touch input is not a false positive.

Concurrent with, or in response to, the determination that the touch input is not a false positive, a touch-input sensor (e.g., touch-input sensor 306) may generate a heatmap (e.g., heatmap 504).

Figure 17:
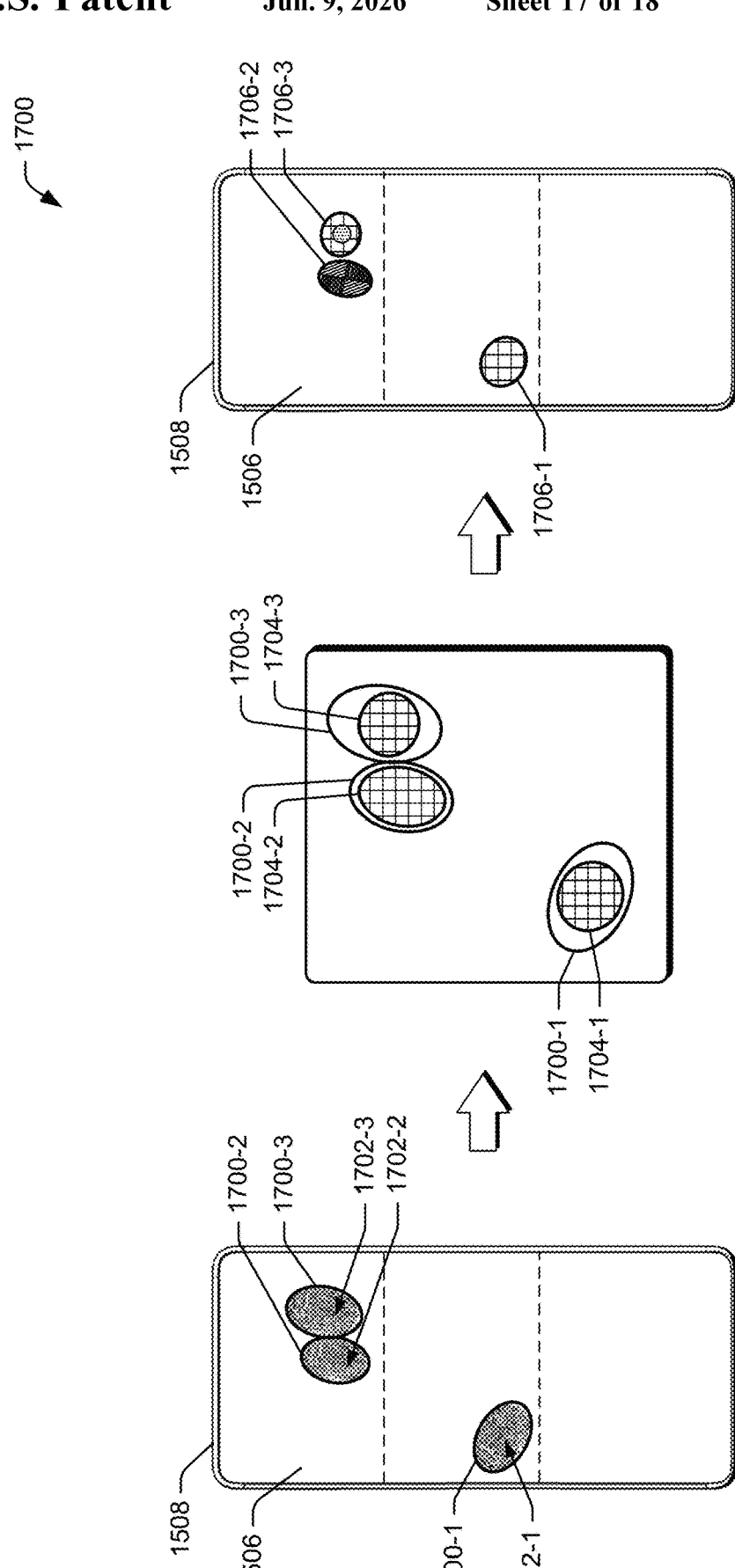
FIG. 17 illustrates example techniques of determining a shape and location of user input to provide spatially-configured localized illumination.

Continuing with this example, FIG. 17 illustrates example techniques of determining a shape and location of user input 1504 to provide spatially-configured localized illumination. In aspects, the biometric authentication manager may determine shapes for the user input 1504 in contact with the display, including three shapes 1700 (e.g., shape 1700-1, shape 1700-2, shape 1700-3) outlining the three fingertips having fingerprints 1702 (e.g., fingerprint 1702-1, fingerprint 1702-2, fingerprint 1702-3), respectively. In at least some implementations, the biometric authentication manager may resize shape 1700-2 into a smaller shape 1704-2. The smaller shape 1704-2 may be collocated with and similar to, but smaller in area than, shape 1700-2. The biometric authentication manager may replace shape 1700-1 and shape 1700-3 with preset shape 1704-1 and preset shape 1704-3, respectively. Preset shape 1704-1 and preset shape 1704-3 may be collocated with and smaller in area than shape 1700-1 and shape 1700-3, respectively, but not similar thereto.

Based on the three shapes 1704, the biometric authentication manager may instruct a DDIC (e.g., the DDIC 312) to generate high-luminance regions 1706 (e.g., high-luminance region 1706-1, high-luminance region 1706-2, high-luminance region 1706-3) on the display 1506 collocated with and similar to a contact area between the three fingertips and the display 1206. Further, the biometric authentication manager may instruct the DDIC to cause the pixels (e.g., organic light-emitting diodes) within one or more portions of the high-luminance regions 1706 to generate high-luminance light of varying colors and luminosities. For example, as illustrated in FIG. 17, high-luminance region 1706-1 may emit green light at a luminosity of 1000 nits. A first portion of high-luminance region 1706-2 may emit red light at a luminosity of 1000 nits and a second portion of high-luminance region 1706-2 may emit blue light at a luminosity of 1100 nits. A portion of high-luminance region 1706-3 may emit infrared light. In this way, spatially, temporally, and/or chromatically variable light from the high-luminance regions can illuminate the user input to facilitate fingerprint sensing by the optical UDFPS and enhance spoof detection. If the biometric authentication manager can authenticate the user through analysis of the fingerprints and validate liveness of the user input, then the biometric authentication manager can transfer the electronic device 1208 from the locked state 1210 to an unlocked state.

Figure 18:
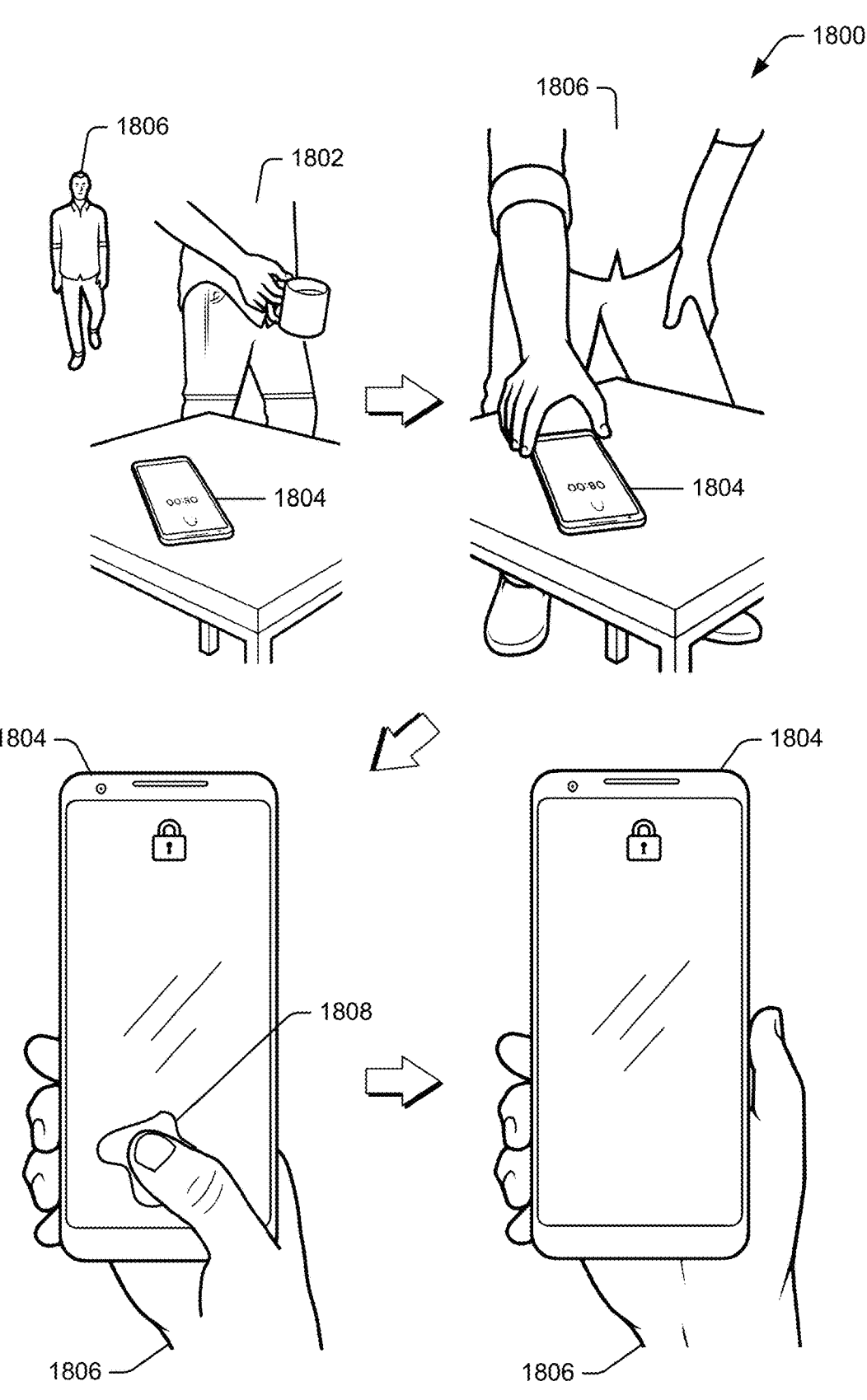
FIG. 18 illustrates an example implementation of an example electronic device configured to implement spatially-configurable localized illumination for biometric authentication systems.

FIG. 18 illustrates an example implementation 1800 of an example electronic device configured to implement spoof detection using spatially-configurable localized illumination for biometric authentication systems. As illustrated, a user 1802 in a coffee shop leaves his wireless-network device 1804 unattended to get some creamer. A bad actor 1806, seizing the opportunity, grabs the wireless-network device 1804. The bad actor 1806 then attempts to spoof a biometric authentication system of the wireless-network device 1804 using a mold 1808 of a latent fingerprint resembling the authorized user's fingerprint. The biometric authentication system can reject the spoof fingerprint when it determines that liveness characteristics are absent (e.g., optical characteristics of the user input are dissimilar to optical characteristics of skin tissue).

A biometric authentication system using the systems and techniques described herein can provide many additional benefits, including, as non-limiting examples, reduced processing latency, reduced power expenditure, and better user experience. For example, in comparison to a biometric authentication system configured to utilize a display to illuminate a user input and then utilize an optical UDFPS to detect the user input, the systems and techniques described herein enable a biometric authentication system to utilize a touch-input sensor to detect user input. Using the touch-input sensor, the biometric authentication system can rely on a low-power resource to more-accurately identify and locate user input, without having to illuminate (e.g., power on) the display. Further, the biometric authentication system can more-quickly locate a position of user input in a verify print produced by an optical UDFPS when informed by a touch-input sensor. Whereas, in at least some other configurations, a biometric authentication system may utilize image detection on a low-resolution verify print to identify a location of user input. Additionally, a biometric authentication system using the techniques described herein can more-quickly ascertain an orientation of the user input when informed by the touch-input sensor. In so doing, processing latency, as well as power expenditure, can be reduced, which can further increase user experience.

A biometric authentication system using the systems and techniques described herein can further be configured to alter a brightness of a touch-sensitive display (e.g., at high-luminance regions 1406) responsive to the biometric authentication system receiving a reflection of user input (e.g., at an optical UDFPS) or analyzing the user input. For example, a biometric authentication system may be configured to reduce a brightness of a high-luminance region responsive to an optical UDFPS receiving a reflection of a user input, such that an entire display has a uniform brightness.

In addition to the above descriptions, a fingerprint sensor (e.g., optical UDFPS 902, an ultrasonic fingerprint sensor), a touch-input sensor (e.g., touch-input sensor 306), and processors (e.g., processors 204), as well as communication techniques therebetween, can be optimized to further expedite biometric authentication. For example, a biometric authentication system having a biometric authentication manager (e.g., biometric authentication manager 216) can select a subregion, based on location coordinates received by the touch-input sensor, within a verify print that includes a focused (e.g., cropped, reduced) view of the user input. This subregion selection can improve synchronous serial communication (SPI) direct memory access (DMA) transfer speed, as well as reduce power. In this way, the biometric authentication manager can analyze the focused view of the verify print having user input for biometric identifiers more quickly and reliably.

Further to the above descriptions, a biometric authentication system using the systems and techniques described herein can provide higher accuracy. For example, determining a shape of a contact area of sustained contact with a touch-sensitive display allows for more-accurate shape and location estimation than, for example, centroid approximation. Centroid approximation of a touch input may provide accurate estimation of a singular point for the touch input, but is sub-optimal in ascertaining an overall shape, size, and location of the touch input. Whereas, determining a shape of a contact area of sustained contact with a touch-sensitive display using a heatmap generated by a touch-input sensor allows for greater accuracy.

EXAMPLES

In the following section, additional examples are provided.

Example 1: A method comprising: receiving a fingertip touch input from a user, the fingertip touch input in contact with a touch-sensitive display; determining, responsive to receiving the fingertip touch input, a contact area of the contact with the touch-sensitive display; altering, responsive to determining the contact area of the contact, a color of light emitted by one or more portions of the touch-sensitive display at the contact area; receiving a fingerprint reflection of the fingertip touch input, the fingerprint reflection being a reflection from the fingertip touch input caused by the altered color of light emitted from the one or more portions of the touch-sensitive display at the contact area; and determining, based on the received fingerprint reflection, that the fingerprint reflection of the fingerprint touch input indicates a live, human finger.

Example 2: The method as described in example 1, further comprising, prior to determining the contact area or prior to altering the color of light, determining that a resource of a computing device associated with the touch-sensitive display is locked from access.

Example 3: The method as described in example 2, wherein the resource of the computing device associated with the touch-sensitive display is a resource requiring authentication prior to the access, the resource requiring authentication being a computer program, an internet-enabled account, or a peripheral device.

Example 4: The method as described in any of the previous examples, further comprising, responsive to determining that the received fingerprint reflection of the fingerprint touch input indicates a live, human finger and is authorized to access the resource of the computing device, unlocking the resource of the computing device.

Example 5: The method as described in any of the previous examples, further comprising, responsive to determining that the received fingerprint reflection of the fingerprint touch input indicates a live, human finger and is not authorized to access the resource of the computing device, denying access to the resource of the computing device.

Example 6: The method as described in any of the previous examples, further comprising: receiving a second fingertip touch input from the user, the second fingertip touch input in a second contact with the touch-sensitive display; determining, responsive to receiving the second fingertip touch input, a second contact area of the second fingertip touch input in the second contact with the touch-sensitive display; altering, responsive to determining the second contact area of the second contact, a second color of light emitted by a second one or more portions of the touch-sensitive display at the second contact area; receiving a second fingerprint reflection of the second fingertip touch input, the second fingerprint reflection being a second reflection from the second fingertip touch input caused by the second color of light emitted from the second one or more portions of the touch-sensitive display at the second contact area; and determining, based on the received second fingerprint reflection, that the second fingerprint reflection of the second fingertip touch input indicates a second live, human finger.

Example 7: The method as described in example 6, further comprising, responsive determining that the received second fingerprint reflection of the second fingertip touch input indicates a second live, human finger, determining that the fingerprint reflection, the second fingerprint reflection, or a combination thereof are indicative of an authorization to access the resource of the computing device.

Example 8: The method as described in any of the previous examples, further comprising, responsive to determining a contact area of the contact, altering a luminosity of light emitted by the one or more portions of the touch-sensitive display at the contact area.

Example 9: The method as described in any of the previous examples, wherein determining the contact area of the contact with the touch-sensitive display includes receiving a raw heatmap and determining, based on the raw heatmap, a location of the contact area.

Example 10: The method as described in any of the previous examples, wherein altering a color of light emitted by one or more portions of the touch-sensitive display at the contact area is sufficient to generate colored light.

Example 11: The method as described in any of the previous examples, wherein altering a color of light emitted by one or more portions of the touch-sensitive display at the contact area is sufficient to generate electromagnetic waves at frequency greater than 700 nanometers.

Example 12: The method as described in any of the previous examples, wherein altering the color of light is effective to amplify characteristics of the fingertip touch input in the fingerprint reflection.

Example 13: The method as described in any of the previous examples, wherein determining that the fingerprint reflection of the fingerprint touch input indicates a live, human finger is based on a machine-learned model trained to reject spoof fingers if the fingerprint reflection exhibits optical characteristics dissimilar to optical characteristics of live, human fingers.

Example 14: An electronic device comprising: an electronic visual display; one or more processors; and memory storing: instructions that, when executed by the one or more processors, cause the one or more processors to implement a biometric authentication manager to provide spoof detection using spatially-configurable localized illumination for biometric authentication, by performing the method of any one of the preceding examples.

Example 15: A computer-readable medium comprising instructions which, when executed by one or more processors, cause the one or more processors to carry out the method of any of examples 1 to 13.

CONCLUSION

Although implementations of techniques for, and apparatuses enabling, spoof detection using spatially-configurable localized illumination for biometric authentication systems have been described in language specific to features and/or methods, it is to be understood that the subject of the appended claims is not necessarily limited to the specific features or methods described. Rather, the specific features and methods are disclosed as example implementations enabling the implementation of spoof detection using spatially-configurable localized illumination for biometric authentication systems.

What is claimed is:

1. A method comprising:
   receiving a fingertip touch input from a user, the fingertip touch input in contact with a touch-sensitive display;
   determining, responsive to receiving the fingertip touch input, an irregularly-shaped contact area of the fingertip touch input in contact with the touch-sensitive display, the determining the irregularly-shaped contact area of the contact with the touch-sensitive display including:

receiving a raw heatmap; and
   determining, based on the raw heatmap, a location of the irregularly-shaped contact area;
   altering, responsive to determining the irregularly-shaped contact area of the contact, a color of light emitted by one or more portions of the touch-sensitive display within the irregularly-shaped contact area;
   receiving a fingerprint reflection of the fingertip touch input, the fingerprint reflection being a reflection from the fingertip touch input caused by the altered color of light emitted from the one or more portions of the touch-sensitive display at the irregularly-shaped contact area; and
   determining, based on the received fingerprint reflection, that the fingerprint reflection of the fingerprint touch input indicates a live, human finger.

2. The method as described in claim 1, further comprising, prior to determining the irregularly-shaped contact area or prior to altering the color of light, determining that a resource of a computing device associated with the touch-sensitive display is locked from access.

3. The method as described in claim 2, wherein the resource of the computing device associated with the touch-sensitive display is a resource requiring authentication prior to the access, the resource requiring authentication being a computer program, an internet-enabled account, or a peripheral device.

4. The method as described in claim 3, further comprising, responsive to determining that the received fingerprint reflection of the fingerprint touch input indicates a live, human finger and is authorized to access the resource of the computing device, unlocking the resource of the computing device.

5. The method as described in claim 1, further comprising, responsive to determining that the received fingerprint reflection of the fingerprint touch input indicates a live, human finger and is not authorized to access the resource of the computing device, denying access to the resource of the computing device.

6. The method as described in claim 1, further comprising, responsive to determining the irregularly-shaped contact area of the contact, altering a luminosity of light emitted by the one or more portions of the touch-sensitive display within the irregularly-shaped contact area.

7. The method as described in claim 1, wherein altering a color of light emitted by one or more portions of the touch-sensitive display within the irregularly-shaped contact area is sufficient to generate colored light.

8. The method as described in claim 1, wherein altering a color of light emitted by one or more portions of the touch-sensitive display within the irregularly-shaped contact area is sufficient to generate electromagnetic waves at frequency greater than 700 nanometers.

9. The method as described in claim 1, wherein altering the color of light is effective to amplify characteristics of the fingertip touch input in the fingerprint reflection.

10. The method as described in claim 1, wherein determining that the fingerprint reflection of the fingerprint touch input indicates a live, human finger is based on a machine-learned model trained to reject spoof fingers if the fingerprint reflection exhibits optical characteristics dissimilar to optical characteristics of live, human fingers.

11. The method of claim 1, wherein determining the irregularly-shaped contact area further includes calculation of a line drawing algorithm based on the raw heatmap.

12. The method of claim 1, wherein altering the color of light emitted by one or more portions of the touch-sensitive display within the irregularly-shaped contact area alters the color at an offset from a contour of the irregularly-shaped contact area.

13. The method of claim 12, where in the offset is determined based on at least one of an ambient light of an environment in which the touch-sensitive display resides, an amount of potential light leakage from the touch-sensitive display, a current brightness setting of the touch-sensitive display, a determined curvature of the user input, or a size of the irregularly-shaped contact area.

14. An electronic device comprising:

an electronic visual display;

one or more processors; and memory storing one or more programs to be executed by the one or more processors, the one or more programs comprising instructions for:

receiving a fingertip touch input from a user, the fingertip touch input in contact with a touch-sensitive display;

determining, responsive to receiving the fingertip touch input, an irregularly-shaped contact area of the fingertip touch input in contact with the touch-sensitive display, the determining the irregularly-shaped contact area of the contact with the touch-sensitive display including:

receiving a raw heatmap; and determining, based on the raw heatmap, a location of the irregularly-shaped contact area;

altering, responsive to determining the irregularly-shaped contact area of the contact, a color of light emitted by one or more portions of the touch-sensitive display within the irregularly-shaped contact area;

receiving a fingerprint reflection of the fingertip touch input, the fingerprint reflection being a reflection from the fingertip touch input caused by the altered color of light emitted from the one or more portions of the touch-sensitive display within the irregularly-shaped contact area; and determining, based on the received fingerprint reflection, that the fingerprint reflection of the fingerprint touch input indicates a live, human finger.

15. The electronic device as described in claim 14, wherein the one or more programs further comprise instructions for:

prior to determining the irregularly-shaped contact area or prior to altering the color of light, determining that a resource of a computing device associated with the touch-sensitive display is locked from access.

16. The electronic device as described in claim 15, where in the one or more programs further comprise instructions for:

responsive to determining that the received fingerprint reflection of the fingerprint touch input indicates a live, human finger and is authorized to access the resource of the computing device, unlocking the resource of the computing device; or responsive to determining that the received fingerprint reflection of the fingerprint touch input indicates a live, human finger and is not authorized to access the resource of the computing device, denying access to the resource of the computing device.

17. The electronic device as described in claim 14, wherein the one or more programs further comprise instructions for:

responsive to determining an irregularly-shaped contact area of the contact, altering a luminosity of light emitted by the one or more portions of the touch-sensitive display within the irregularly-shaped contact area.

18. The electronic device of claim 14, wherein determining the irregularly-shaped contact area further includes calculation of a line drawing algorithm based on the raw heatmap.

19. The electronic device of claim 14, wherein altering the color of light emitted by one or more portions of the touch-sensitive display within the irregularly-shaped contact area alters the color at an offset from a contour of the irregularly-shaped contact area.

20. The electronic device of claim 19, wherein the offset is determined based on at least one of an ambient light of an environment in which the electronic device resides, an amount of potential light leakage from the touch-sensitive display, a current brightness setting of the touch-sensitive display, a determined curvature of the user input, or a size of the irregularly-shaped contact area.

\* \* \* \* \*